United States Patent
Lewis et al.

(10) Patent No.: US 12,526,249 B2
(45) Date of Patent: Jan. 13, 2026

(54) DRAFT MESSAGE OBJECT COLLABORATION IN A GROUP-BASED COMMUNICATION PLATFORM

(71) Applicant: Salesforce, Inc., San Francisco, CA (US)

(72) Inventors: Tyler Lewis, San Anselmo, CA (US); Joseph Michael McGarr, Mountain View, CA (US); Felix Rieseberg, San Francisco, CA (US); Issac Gerges, Austin, TX (US); Anuj Nair, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 8 days.

(21) Appl. No.: 18/444,451

(22) Filed: Feb. 16, 2024

(65) Prior Publication Data

US 2024/0195764 A1    Jun. 13, 2024

Related U.S. Application Data

(63) Continuation of application No. 17/234,137, filed on Apr. 19, 2021, now Pat. No. 11,943,180.

(51) Int. Cl.
*G06F 15/16* (2006.01)
*G06F 3/04842* (2022.01)
(Continued)

(52) U.S. Cl.
CPC ........ *H04L 51/046* (2013.01); *G06F 3/04842* (2013.01); *G06F 40/169* (2020.01); *H04L 12/1813* (2013.01); *H04L 51/08* (2013.01)

(58) Field of Classification Search
CPC ... H04L 51/046; H04L 12/1813; H04L 51/08; G06F 40/169; G06F 3/04842
(Continued)

(56) References Cited

U.S. PATENT DOCUMENTS

| 2010/0217804 A1 | 8/2010 | Carrer et al. |
| 2011/0030031 A1 | 2/2011 | Lussier et al. |

(Continued)

FOREIGN PATENT DOCUMENTS

WO    WO-2018169711 A1 *  9/2018

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Imad Hussain
(74) *Attorney, Agent, or Firm* — Lee & Hayes, P.C.

(57) ABSTRACT

Draft message object collaboration in a group-based communication platform is described. A request to generate a message object can be received from a first client associated with a first entity of a group-based communication platform. A first instance of a composition user interface, configured to enable a draft of the message object to be generated, can be presented via the first client and a request to add a second entity as a collaborator can be received. A second instance of the composition user interface can be presented via a second client of the second entity. A modification to the draft of the message object can be received and, in response to receiving the modification, the message object can be updated as presented via respective instances of the composition user interface.

20 Claims, 11 Drawing Sheets

(51) Int. Cl.
  *G06F 40/169* (2020.01)
  *H04L 12/18* (2006.01)
  *H04L 51/046* (2022.01)
  *H04L 51/08* (2022.01)

(58) Field of Classification Search
  USPC .......................................................... 709/205
  See application file for complete search history.

(56) References Cited

U.S. PATENT DOCUMENTS

| | | | | |
|---|---|---|---|---|
| 2011/0252339 | A1* | 10/2011 | Lemonik | H04L 67/01 |
| | | | | 715/753 |
| 2013/0138671 | A1 | 5/2013 | Cleaver et al. | |
| 2015/0067058 | A1 | 3/2015 | Luz et al. | |
| 2016/0182412 | A1 | 6/2016 | Kabbes et al. | |
| 2018/0124129 | A1* | 5/2018 | Geisler | H04L 67/06 |
| 2018/0287982 | A1 | 10/2018 | Draeger et al. | |
| 2019/0075146 | A1 | 3/2019 | Nikolaou | |
| 2020/0026783 | A1* | 1/2020 | Watanabe | G06F 16/176 |
| 2020/0076746 | A1* | 3/2020 | Penrose | G06N 3/08 |
| 2020/0349120 | A1 | 11/2020 | Crane et al. | |
| 2021/0099539 | A1 | 4/2021 | Shortt et al. | |
| 2021/0119809 | A1* | 4/2021 | Lee | H04L 9/321 |
| 2021/0201371 | A1 | 7/2021 | Andrews et al. | |
| 2021/0409416 | A1* | 12/2021 | Reyna Fernandez | H04L 51/18 |
| 2022/0337537 | A1 | 10/2022 | Lewis et al. | |
| 2023/0004936 | A1 | 1/2023 | Ghosh et al. | |

OTHER PUBLICATIONS

Atlassian, "Atlassian Documentation: Confluence Data Center and Server 7.1," Atlassian, Nov. 4, 2019, 10 pages.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 pm).
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 am) 4 pages.
"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 pm) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 pm), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 pm), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000), pp. 154-161.
Office Action for U.S. Appl. No. 17/234,137, mailed on Mar. 3, 2023, Tyler Lewis, "Draft Message Object Collaboration in a Group-Based Communication Platform", 22 pages.
Office Action for U.S. Appl. No. 17/234,137, mailed on Jun. 20, 2023, Tyler Lewis, "Draft Message Object Collaboration in a Group-Based Communication Platform", 23 pages.
Office Action for U.S. Appl. No. 17/234,137, mailed on Oct. 4, 2022, Tyler Lewis, "Draft Message Object Collaboration in a Group-Based Communication Platform", 19 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 pm) 5 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

DRAFT MESSAGE OBJECT COLLABORATION IN A GROUP-BASED COMMUNICATION PLATFORM

CROSS-REFERENCE TO RELATED APPLICATIONS

This application is a continuation of, and claims priority to U.S. patent application Ser. No. 17/234,137 filed on Apr. 19, 2021, which is incorporated herein in its entirety by reference.

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating message objects posted to and/or actions taken with respect to a particular channel, direct message, and/or other virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
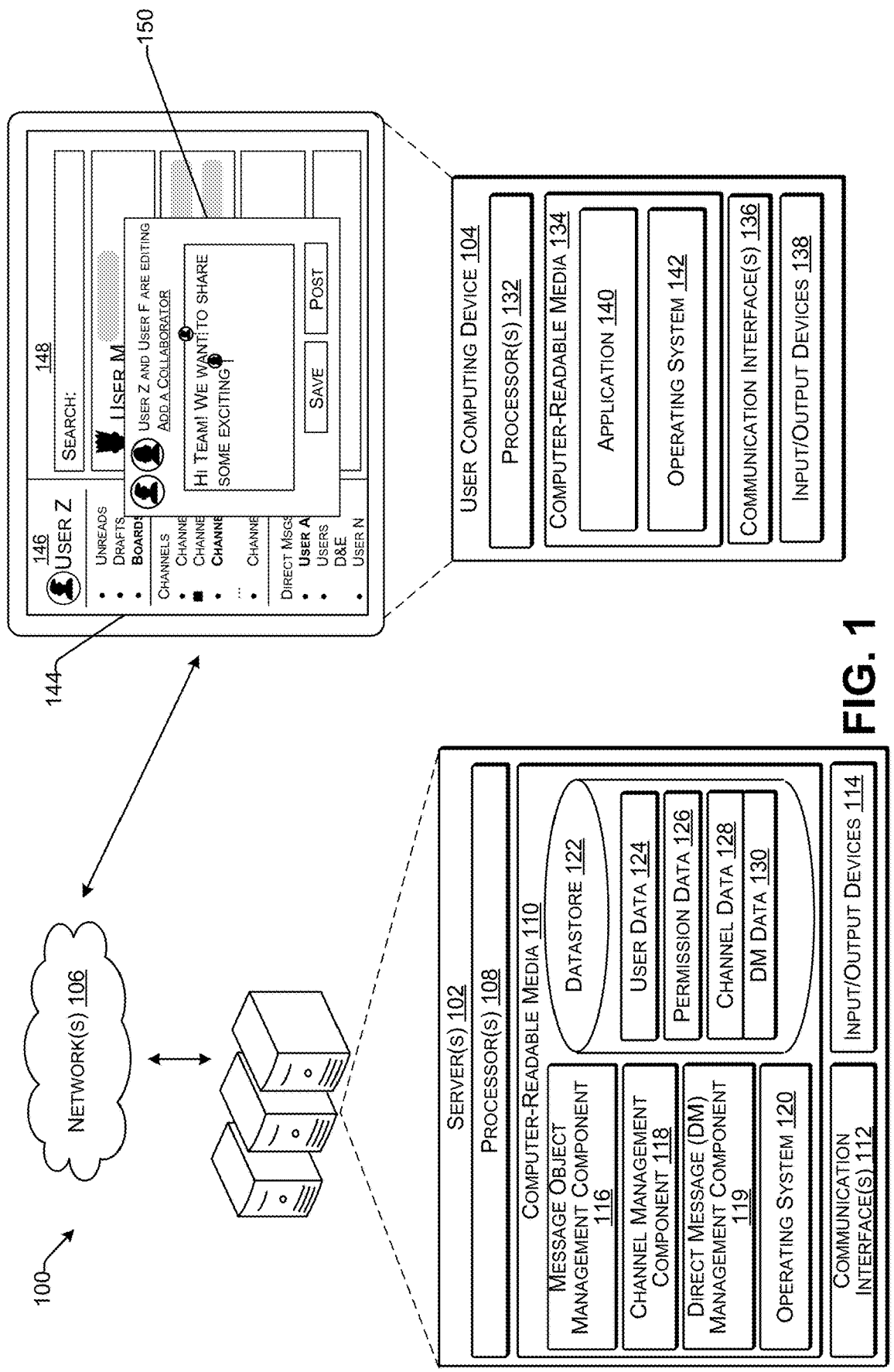
FIG. 1 illustrates an example environment for performing techniques described herein.

Draft message object collaboration for a communication platform is described herein. The communication platform, which, in some examples can be a group-based communication platform, a channel-based communication platform, a permission-based communication platform, a channel-based messaging platform, and/or any other platform for facilitating communication between and among users, can enable users to exchange message objects and/or other data via the communication platform. In existing techniques, a single user can draft a message object and post the message object to a virtual space of the communication platform. Such a virtual space can comprise a channel, direct message, board, and/or the like. In some examples, however, multiple users may desire to collaborate on a message object before posting the message object to a virtual space. For instance, with reference to a press release, announcement, communication to a business partner, and/or the like, multiple users may desire to collaborate on such a message object. Techniques described herein are directed to techniques for facilitating such collaboration. For instance, techniques described herein relate to a composition user interface wherein a user can add other users or entities to collaborate on drafting a message object. When the message object is ready to post, the message object can be posted to one or more virtual platforms with an indication that the sender of the message object is the group of users that collaborated on the drafting of the message object. In some examples, such users can have permissions to edit the posted message object collaboratively (i.e., together, in real-time or near real-time, via respective instances of the composition user interface). As such, techniques described herein enable multiple users to collaborate on a message object in a communication platform.

For purposes of this discussion, a "message object" can refer to any electronically generated digital object, provided by a user using a client associated with the communication platform, that is configured for display within a channel, direct message, and/or other virtual space of the communication platform for facilitating communications as described herein. A message object may include any text, image, video, audio, or combination thereof provided by a user (using a client). For instance, a message object can include text, as well as an image and/or a video, as message object contents. In some examples, a message object can be associated with an image and/or a video that is embedded in (e.g., via a link) or attached to the message object. In at least one example, the text, image, and/or video can comprise the message object. In some examples, message objects can be associated with one or more files or other attachments, emojis, reactjis, and/or the like. In some examples, message objects can include or be associated with one or more links to content stored by the communication platform or a third-party platform or service. Each message object can include metadata comprising a one or more sending user identifiers (e.g., identifying sender(s) or originator(s) of the message object), one or more recipient user identifiers (e.g., identifying user(s) and/or entity(s) that is/are intended to receive the message object), a message object identifier (e.g., identifying the message object itself), a group identifier (e.g., identifying a group associated with the sender(s), the recipient(s), and/or the message object), a channel identifier (e.g., identifying a channel associated with the sender(s), the recipient(s), and/or the message object), a direct message identifier (e.g., identifying a direct message associated with the sender(s), the recipient(s), and/or the message object), a virtual space identifier (e.g., identifying a virtual space associated with the sender(s), the recipient(s), and/or the message object), and/or the like. In at least one example, each of the foregoing identifiers may comprise American Standard Code for Information Interchange (ASCII) text, a pointer, a memory address, or the like. In some examples, message object metadata can include message object content, permission(s) associated with the message object (e.g., viewing permission(s), editing permission(s), etc.), and/or the like in addition to the one or more identifiers listed above.

In an example, the communication platform can receive a request, from a first client of a first user, to generate a new message object. The communication platform can cause an instance of a composition user interface to be presented via the first client. The first user can invite second user(s) to collaborate on the new message object. The communication platform can cause additional instance(s) of the composition user interface to be presented via second client(s) of the second user(s). As such, the first user and the second user(s) can collaborate—in real-time or near real-time—to generate and/or edit a draft of a message object. That is, the first user and second user(s) can provide comments and/or other feedback, make revisions, additions, and/or other modifications, accept changes, and/or the like via the respective instances of the composition user interface in real-time or near real-time. When the message object is ready to be posted, or otherwise presented, one of the users can provide an input (e.g., to a corresponding instance of the composition user interface) to cause the message object to be posted to, or otherwise presented via, one or more virtual spaces. In such an example, the message object can be posted to, or otherwise presented via, the one or more virtual spaces and can be identified as having been sent and/or having originated from the first user and the second user(s). Such techniques can be useful for drafting press releases, announcements, business client communications, and/or the like.

As described above, in at least one example, the first user can invite second user(s) to collaborate on a draft of a message object. In some examples, a first entity can invite second entity(s) to collaborate on a draft of a message object. An example of such an entity can comprise a user, a role (e.g., marketing team member, engineer, front desk staff, security team member, administrator, etc.), an application, a channel (i.e., members of the channel), a direct message (i.e., members of the direct message), a board (i.e., members of the board), and/or the like. As such, the first and second entities can collaborate in drafting the new message object. Such collaborators (i.e., the first and second entities) can be associated with a first set of actions that are different than other users and/or entities that are not collaborators when the message object is posted to, or presented via, the virtual space. That is, in at least one example, the first and second entities can have access to view, edit, interact, etc. with the new message object when posted, or otherwise presented, and/or can be notified when another user and/or entity responds to the new message object (e.g., reaction, thread message object, etc.). That is, such collaborators can have access to the new message object as if any one of the collaborators individually generated and posted the new message object.

While techniques described herein are described with reference to "message objects," techniques described herein can be similarly applicable to any other object that can be generated via the communication platform. Examples of such objects can comprise documents, posts, channel descriptions, user profiles, board content, and/or the like. Furthermore, techniques described herein are described in the context of enabling collaboration for message objects and/or other objects to be posted to the communication platform. However, in some examples, techniques described herein can be similarly applicable to generating message objects and/or other objects for posting on third-party platforms, such as social media platforms, email platforms, and/or the like. That is, in some examples, techniques described herein can be applicable to draft message object collaboration within the communication platform for a message object that is posted or otherwise presented via a third-party platform that is integrated with the communication platform (e.g., via one or more application programming interfaces (APIs) and/or software development kits (SDKs)). Additional details are described below.

Techniques described herein can streamline message object drafting and/or editing in view of current techniques. As described above, the communication platform can utilize permissions to maintain security and privacy for users of the communication platform. However, such permissions can restrict the ability of multiple users or entities to collaborate on drafting message objects or other objects. Due to current limitations of existing technology, users are required to collaborate via another platform (e.g., a word processing platform, an email platform, or the like) to draft a message object or other object. When the message object or other object is ready on the other platform, one of the collaborators can copy the text or other data as generated in the other platform and paste the text or other data into the communication platform. In some examples, when such text or other data is pasted into the communication platform, the text or other data loses formatting or is introduced in a format that is inconsistent with the communication platform. In some examples, the communication platform can enable a user to re-format the text or other data. Nevertheless, with current techniques, collaborators are required to use multiple platforms if they want to collaborate on a message object or other object prior to posting the message object or other object to the communication platform. Once posted, editing permissions may be limited to the posting user. As such, the other collaborators may not be permitted to edit the message object or other object without going through the posting user. This can cause multiple interactions, with multiple platforms, which can be computationally expensive and cause network congestion. Techniques described herein enable improved techniques that reduce consumption of computing resources and decrease network congestion. Additional or alternative improvements to those described above are described below with reference to the figures.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, message objects, and/or virtual spaces, have security (that can be defined by permissions) to limit access to defined groups of users, such a defined group of users having, for instance, sole access to a given channel, message object, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message object, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, message objects, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, message objects, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a message object management component 116, a channel management component 118, a direct message management component 119, an operating system 120, and a datastore 122.

In at least one example, the message object management component 116 can manage generating, posting and/or presenting, editing, and/or the like of message objects associated with the communication platform. In at least one example, the message object management component 116 can receive a request to generate a new message object from a client of a user or other entity. In at least one example, the message object management component 116 can generate a message object in response to receiving the request to generate the new message object. In some examples, while a message associated with the message object is being composed, the message object can be associated with an indication that the message object is a draft and/or is not posted or otherwise presented. In at least one example, the message object management component 116 can cause a composition user interface to be presented via the client to enable the user to associate data with the message object (e.g., text, image(s), video(s), link(s), file(s), etc.). In some examples, as the user or other entity associates data with the message object, the client can send such data to the message object management component 116. The message object management component 116 can store such data in association with the message object. As such, the message object can persist on the server(s) 102, which can allow for draft synchronization and/or message object collaboration, as described herein.

In at least one example, the user or other entity can request to add at least one other user or other entity as a collaborator to collaborate with the other user or other entity. As such, the message object can be associated with multiple collaborators, each which can provide input for composing the message object via respective instances of the composition user interface. As described above, each of the collaborators can comprise a user, a role, an application, a channel (e.g., members associated therewith), a direct message (e.g., members associated therewith), a board (e.g., members associated therewith), and/or the like. In some examples, the collaborators can be associated with two or more organizations. In at least one example, the message object can be associated with identifiers of each of the collaborators. In some examples, prior to associating another user or other entity with the message object as a collaborator, the message object management component 116 can send an invitation to a client of the other user or entity, inviting them to collaborate on the message object. In such examples, the message object management component 116 can wait to associate identifier(s) of the other collaborator(s) with the message object until an acceptance of the invitation is received. That is, in at least one example, the message object management component 116 can associate the identifier(s) of the invited collaborator(s) (e.g., user(s) and/or entity(s)) with the message object in response to receiving an acceptance of the invitation.

In at least one example, each of the collaborators can interact with respective instances of the composition user interface to provide comments and/or other feedback, add new content to a message object, remove contents of a message object, revise contents of the message object, view a history of modifications (e.g., additions, revisions, etc.), accept proposed modifications, and/or the like. In at least one example, the composition user interface can enable the collaborators to generate and/or edit the message object in real-time or near real-time. In at least one example, when a client of one of the collaborators receives an input associated with the message object, the input can be sent to the message object management component 116, which can update the message object based at least in part on such an input. In at least one example, such an input can be pushed to other instances of the composition user interface using techniques such as operational transform or the like. That is, in at least one example, the message object management component 116 can enable real-time or near real-time collaboration on message objects or other objects.

In at least one example, one of the collaborators can provide an input, via the collaboration user interface, to post the message object to, or otherwise present the message object via, one or more virtual spaces. In such an example, the message object management component 116 can receive an indication of such an input and can cause the message object to be posted to, or otherwise presented via, the one or more virtual spaces. In some examples, receipt of such an indication can cause the message object management component 116 to modify the indication that the message object is a draft and/or is not posted or otherwise presented to an indication that the message object is posted or otherwise presented (i.e., and no longer a draft). In at least one example, the message object management component 116 can push, or otherwise provide, the message object to client(s) of each of the member(s) associated with the target virtual space(s) and the message object can be presented in association with the target virtual space(s) on each of the client(s). For example, if a message object is posted to a channel, the message object management component 116 can push, or otherwise provide, the message object to respective clients of each of the members of the channel. As another example, if a message object is posted to a board, the message object management component 116 can push, or otherwise provide, the message object to respective clients of each of the members of the board. In at least one example, the message object can be posted to, or otherwise presented via, the virtual space(s) with an indication of each of the user(s) and/or entity(s) that collaborated on the composition of the message object. That is, the message object can be associated with an indication that the message object originated from each of the collaborators.

In some examples, prior to posting a message object that is associated with multiple collaborators, the message object management component 116 can initiate an approval process. That is, individual message objects can be associated with approval processes that indicate whether approval is required to post or otherwise present the message object and/or from whom approval is required. In some examples, the approval process can be associated with a priority in which individual of the collaborators are to approve the draft message object. In some examples, a particular collaborator can be required to approve the draft message object. In some examples, each of the collaborators can be required to approve the draft message object.

In at least one example, the collaborators can be associated with permission(s) that enable the collaborators to perform a set of actions associated with the message object after it has been posted or otherwise presented. In some examples, non-collaborators may not be associated with the same permission(s) and/or set of actions. In at least one example, the message object management component 116 can receive a request to edit a posted message object. The message object management component 116 can determine whether a user and/or client associated with the request has permission to edit the posted message object. So long as the user and/or client associated with the request has permission to edit the posted message object (e.g., the user and/or client was one of the original collaborators or has otherwise been added as a collaborator), the message object management component 116 can cause an instance of the composition user interface to be presented via the requesting client. As such, the requesting client can receive an input associated with an edit or other modification to the message object and can provide an indication of such an input to the message object management component 116. The message object management component 116 can cause the posted message object to be updated based at least in part on receiving the indication of the input. That is, the message object management component 116 can update the message object and push, or otherwise provide, an update to one or more recipients of the posted message object (e.g., member(s) of the virtual space(s) to which the message object is posted or otherwise presented). In some examples, other collaborators can receive a notification that one of the collaborators has requested to edit the message object such that one or more of the other collaborators can opt to open respective instance(s) of the composition user interface for collaborative editing. In some examples, an approval process, as described above, may be implemented prior to posting or otherwise presenting an edited message.

In some examples, collaborators can be added to a message object after the message object has been posted. That is, in at least one example, a collaborator associated with the message object can request another user or other entity be added as a collaborator after the message object has been posted to or otherwise presented via a virtual space. In such an example, the message object management component 116 can associate the other user or other entity with the message as a collaborator. In such an example, the message object management component 116 can cause an indication of the new collaborator to be presented in association with the message object presented via the user interface, as described herein. In some examples, a user or entity that is not a collaborator at the time the message object is posted or otherwise presented can request to be added as a collaborator. In such examples, the message object management component 116 can receive the request and may add the requesting user or entity as a collaborator. In some examples, the message object management component 116 can utilize permissions to determine whether the requesting user or entity can be added and/or can execute an authorization process for one of the current collaborators to authorize the addition of the requesting user or entity as a collaborator.

In some examples, the message object management component 116 can exchange data with the channel management component 118 and/or the direct message (DM) component 119 to post message objects to virtual spaces managed by each of the components. In some examples, the message object management component 116 can exchange data with other component(s) of the server(s) 102 to post message objects to virtual space(s) managed by such component(s). In some examples, as described above, techniques described herein can be applicable to objects other than message objects. For instance, in at least one example, techniques described herein can be used to enable collaboration on documents, posts, channel descriptions, user profiles, and/or the like, which can be managed by the message object management component 116 or another component of the server(s) 102.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or message objects. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more message objects that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or message objects permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or message objects). In some examples, a direct message can be a private message object between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more message objects that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more board identifiers associated with boards with which the user is associated, a plurality of message objects, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 of a user can indicate a role or position of a user, which can be determined based at least in part on an organizational chart and/or learned. In some examples, the communication platform can analyze messaging and/or other interaction data to determine relationships between users and/or relative ranks and can infer organizational charts. In some examples, the user data 124 of a user can indicate a user type of the user, for example, whether the user is an administrator, a verified user, and/or the like. In at least one example, user type can be a designation provided by the communication platform (e.g., wherein roles can be designated by organizations, workspaces, teams, and/or other groups). In some examples, the communication platform can store indications of which users and/or virtual spaces a user communicates with and/or in, a frequency of such communication, topics associated with such communications, reactions and/or feedback associated with such communications and/or the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In some examples, the permission data 126 can store data associated with permissions of individual message objects or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message object), or the like. In some examples, permissions associated with a message object or other object can be mapped to, or otherwise associated with, data associated with the message object or other object. In some examples, permissions can indicate viewing permissions, access permissions, editing permissions, etc.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored. Individual message objects or other objects posted to a channel can be stored in association with the channel data 128.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored. Individual message objects or other objects posted to a direct message can be stored in association with the DM data 130.

As described above, message objects posted, or otherwise sent and/or received, via channels, direct messages, etc. can be stored in associated with the channel data 128 and/or DM data 130. In some examples, such message objects can additionally or alternatively be stored in association with the user data 124. In some examples, message objects can be associated with individual permissions, as described herein.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s), etc.

In some examples, the datastore 122 can be partitioned into discrete items of data that may be accessed and managed individually (e.g., data shards). Data shards can simplify many technical tasks, such as data retention, unfurling (e.g., detecting that message object contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2A.

In at least one example, the user interface 144 can include a second section 148 (e.g., which can be a portion, pane, or other partitioned unit of the user interface 144) that can be associated with a data feed (or, "feed") indicating message objects posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message object and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, a composition user interface 150, which can enable multiple entities (e.g., users, roles, applications, channels, direct messages, boards, and/or the like) to collaborate on drafting or editing of a message object can be presented via the user interface 144. The composition user interface 150 can be presented as a pop-up, as shown, or an overlay, a portion of the user interface 144, in association with another input mechanism of the user interface 144, a new user interface, and/or the like. In some examples, the composition user interface 150 can be triggered for presentation in response to a request to generate a new message object. In some examples, the composition user interface 150 can be triggered for presentation in response to a request to edit a previously posted message object. In some examples, aspects of the composition user interface 150 can be integrated into other features of the user interface 144, as described below. Additional details associated with the user interface 144 and/or differentiated presentation of message objects and/or user interface(s) are described below with reference to FIGS. 2A-4.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the message object management component 116, the channel management component 118, the direct message management component 119, and the application 140, techniques described herein can be performed by any other component, or combination of components, which can be associated with the server(s) 102, the user computing device 104, or a combination thereof.

Figure 2A:
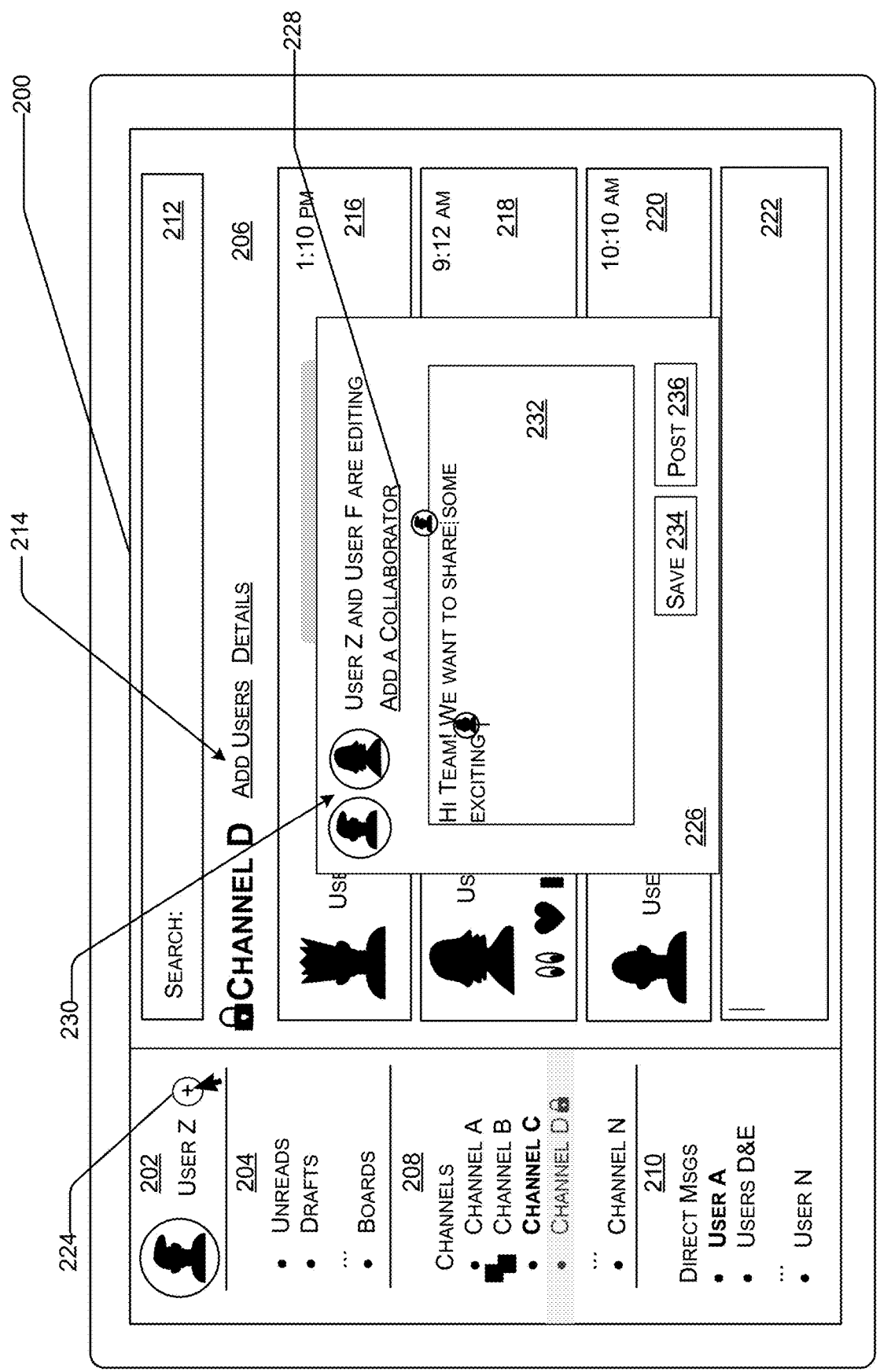
FIG. 2A illustrates an example user interface presented via a communication platform, as described herein, wherein a composition user interface for facilitating draft message object collaboration is presented via the user interface.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed.

In another example, "drafts" can be associated with message objects or other objects that have not yet been posted to a virtual space or otherwise sent to a receiving entity. In at least one example, a message object, while being composed, can be associated with an indicator indicating that the message object is a draft and can therefore be associated with the "drafts" referenced in the second sub-section 208.

In another example, "threads" can be associated with message objects, files, etc. posted in threads to message objects posted in a channel and/or a virtual space associated with "mentions and reactions" (e.g., "M & R") can be associated with message objects or threads where the user (e.g., User F) has been mentioned (e.g., via a tag) or another user has reacted (e.g., via an emoji, reaction, or the like) to a message object or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or video content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message object, performed an action, and/or the like. Additional details are described below.

In at least one example, the first section 202 of the user interface 200 can include a second sub-section 208 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, a new channel, generated subsequent to a request received at the channel management component 118 in FIG. 1 and accessible to the user, can be added to the second sub-section 208. The new channel can be generated by the user or added to the second sub-section 208 in response to acceptance of an invite sent to the user to join a new channel. In some examples, different types of channels (e.g., public, private, shared, etc.) can be in different sections of the second sub-section 208, or can have their own sub-sections or sub-sections in the user interface 200. In some examples, channels associated with different workspaces can be in different portions of the second sub-section 208, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third sub-section 210 that can include user interface elements representative of direct messages. That is, the third sub-section 210 can include user interface elements representative of virtual spaces that are associated with private message objects between one or more users, as described above.

As described above, in at least one example, the user interface 200 can include a second section 206 that can be associated with data associated with virtual spaces of the communication platform. In some examples, data presented via the second section 206 can be presented as a feed indicating message objects posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) and/or entity(s) posted the message object and/or performed an action.

As described above, a "message object" can refer to any electronically generated digital object provided by a user using the user computing device 104 and that is configured for display within a channel, a direct message, and/or another virtual space as described herein. In some examples, a user can comment on a message object in a "thread." A thread can be a message object associated with another message object that is not posted to a channel, direct message, or other virtual space, but instead is maintained within an object associated with the original message object. Message objects and/or threads can be associated with file(s), emoji(s), reactji(s), application(s), etc.

A channel, direct message, or other virtual space can be associated with data and/or content other than message objects, or data and/or content that is associated with message objects. For example, non-limiting examples of additional data and/or content that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission (s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification. The search may be performed with one or more shards associated with each group across which the search is performed.

In FIG. 2A, the user can interact with the user interface element that corresponds to Channel D in the second subsection 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, and 220 which each represent message objects posted to the channel. As illustrated, the user interface elements representative of the message objects 216-220 can include an indication of user(s) and/or entity(s) that posted the message object, a time when the message object was posted, content associated with the message object, reactions associated with the message object (e.g., emojis, reactjis, etc.), and/or the like. In at least one example, the second section 206 can include an input mechanism 222, which can be associated with a composition user interface to enable a user to compose a message object to be posted to the channel. That is, in at least one example, a user can provide input via the input mechanism 222 (e.g., type, speak, etc.) to generate a new message object. In some examples, message objects can be generated by applications and/or automatically by the communication platform. In some examples, the second section 206 can include user interface elements representative of other objects and/or data associated with the channel (or other virtual space).

In some examples, the user interface 200 can include a user interface element 224 that can trigger presentation of a composition user interface 226. For example, the user interface element 224 can be associated with a request to generate a new message object. As illustrated in FIG. 2A, the composition user interface 226 can comprise a pop-up. In some examples, the composition user interface 226 can comprise an overlay or a new user interface. In some examples, input to the input mechanism 222 can trigger presentation of the composition user interface 226. In some examples, aspects described in association with the composition user interface 226 can be integrated with the input mechanism 222 or another aspect of the user interface 200.

As described above, a first entity can request to generate a new message object (e.g., via an interaction with the user interface element 224, input to the input mechanism 222, etc.). As described above, an entity can comprise a user, a role, an application, a channel, a direct message, a board, and/or the like. In at least one example, when an entity is a role, that role can be associated with one or more user profiles. That is, one or more user profiles can be associated with a role, and each of the one or more user profiles can be associated with a message object as a collaborator. In an example where an entity is a channel, a direct message, a board, or the like, user profile(s) of member(s) of the channel, the direct message, the board, or the like can be associated with a message object as a collaborator.

The message object management component 116 can receive the request (i.e., to generate the new message object) and cause the composition user interface 226 to be presented via the user interface 200. In at least one example, the composition user interface 226 can include an actuation mechanism 228 to add a collaborator. In at least one example, based at least in part on receiving an input associated with the actuation mechanism 228, another user interface element can be presented to enable the first entity to identify one or more second entities to add as collaborators. In some examples, the first entity can add collaborators by tagging the collaborators, dragging and dropping an identifier of a collaborator into the composition user interface 226, or the like. In at least one example, the first entity can invite one or more second entities to collaborate on the composition of the message object. That is, the first entity can add one or more second entities to the composition user interface 226 so that each of the second entity(s) can collaborate with the first entity in drafting the message object. As such, the first entity and the second entity(s) can be referred to as "collaborators." In at least one example, the composition user interface 226 can include one or more user interface elements 230 that represent each of the collaborators associated with the message object and/or the composition user interface 226.

In at least one example, the composition user interface 226 can comprise a free form text box 232 or other input mechanism to enable the collaborators to generate contents of the message object. In some examples, the collaborators can attach and/or embed files, videos, images, resource locators (e.g., links), and/or the like to the message object. In at least one example, the composition user interface 226 can include one or more cursors or other indicators to indicate where each of the collaborators is editing in the free form text box 232 or are otherwise interacting with the composition user interface 226. In at least one example, each of the collaborators can see additions, deletions, or other modifications to the content of the message object in real-time or near real-time. In at least one example, each of the collaborators can see comments and/or other feedback provided by other of the collaborators in real-time or near real-time.

In at least one example, the composition user interface 226 can include an actuation mechanism 234 (e.g., "save") to enable the message object to be saved (e.g., as a draft) and an actuation mechanism 236 (e.g., "post") to enable the message object to be posted or otherwise delivered to a recipient of the message object. In at least one example, based at least in part on detecting an input associated with the actuation mechanism 234, the message object can be saved as a draft (i.e., not published). In at least one example, based at least in part on detecting an input associated with the actuation mechanism 236, the message object management component 116 can cause the message object to be posted to, or otherwise presented via, one or more virtual spaces.

Figure 2B:
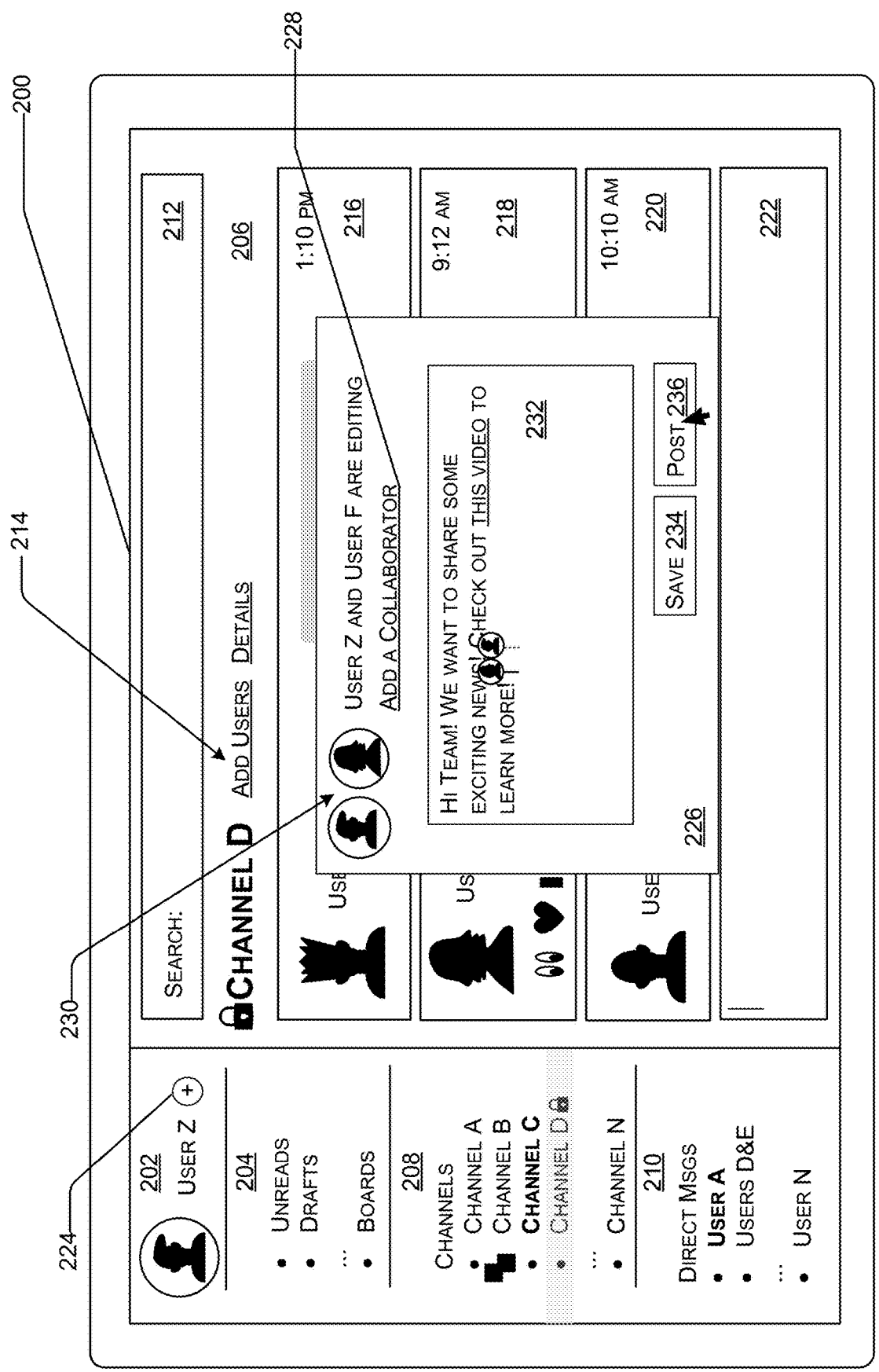
FIG. 2B illustrates the example user interface of FIG. 2A, wherein a mechanism associated with the composition user interface enables the message object to be posted to at least one virtual space of the communication platform.
Figure 2C:
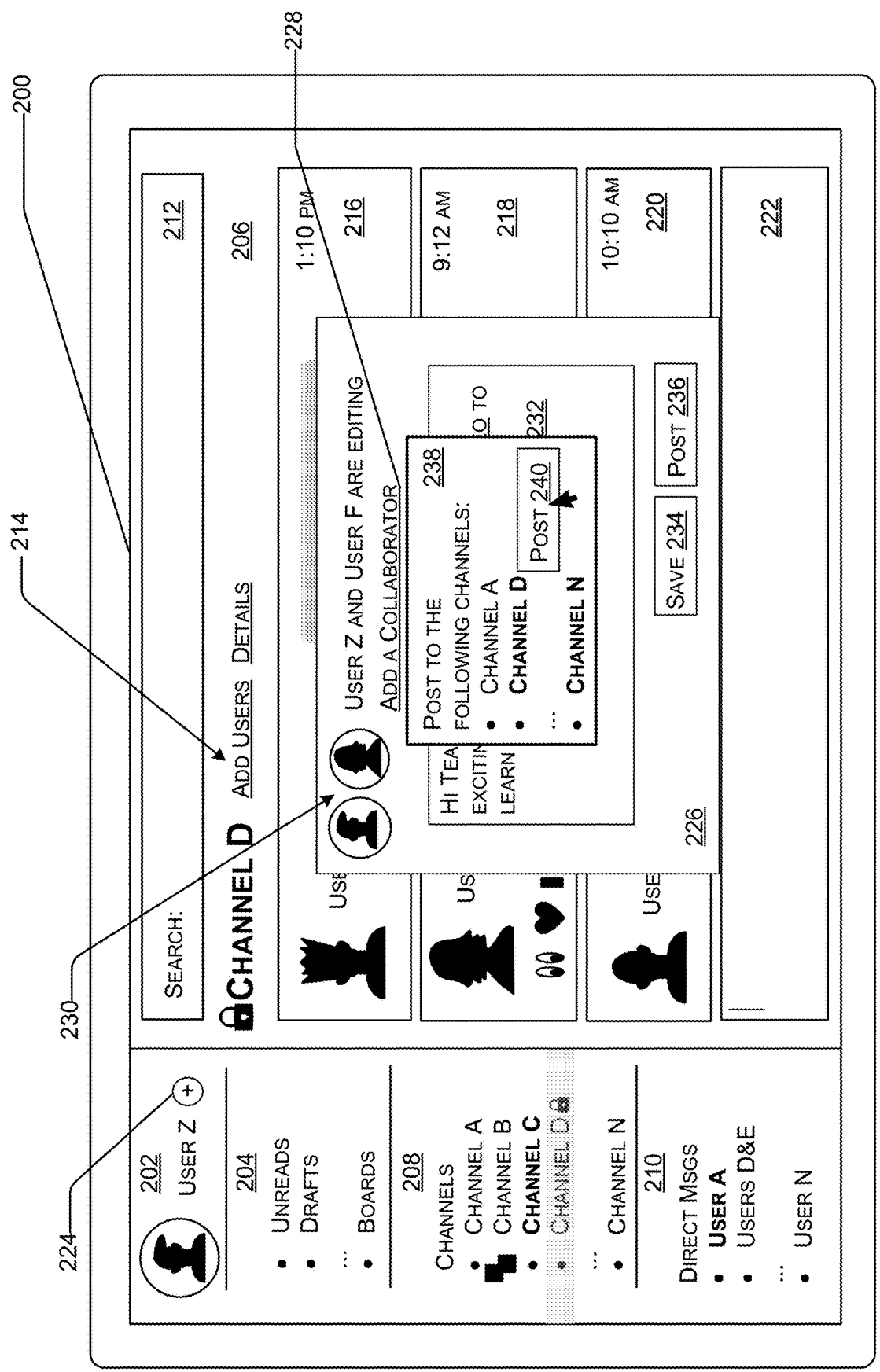
FIG. 2C illustrates the example user interface of FIG. 2A, wherein a mechanism associated with the composition user interface enables the selection of one or more virtual spaces of the communication platform to which the message object is to be posted.

In at least one example, based at least in part on detecting an input associated with the actuation mechanism 236, as illustrated in FIG. 2B, the message object management component 116 can cause a user interface element 238 to be presented via the composition user interface 226. In at least one example, the user interface element 238 can enable a collaborator to select one or more virtual spaces to which the message object is to be posted or otherwise presented, as illustrated in FIG. 2C. As described above, the one or more virtual spaces can comprise channels, direct messages, boards, and/or the like. In some examples, a message object can be posted to or otherwise presented via two channels, a channel and a direct message, two direct messages, a channel and a board, two boards, a direct message and a board, and/or any combination of the foregoing. In at least one example, a collaborator can perform a search of the virtual spaces to which the message object can be posted or otherwise presented. In some examples, a collaborator can scroll or pan to view additional or alternative options than those presented via the user interface element 238. In some examples, the user interface element 238 can comprise a pop-up, as illustrated, an overlay, or the like. In at least one example, the user interface element 238 can include an actuation mechanism 240 (e.g., "post") that can enable a collaborator to provide an input to post the message object to, or otherwise present the object via, the selected virtual space(s).

Figure 2D:
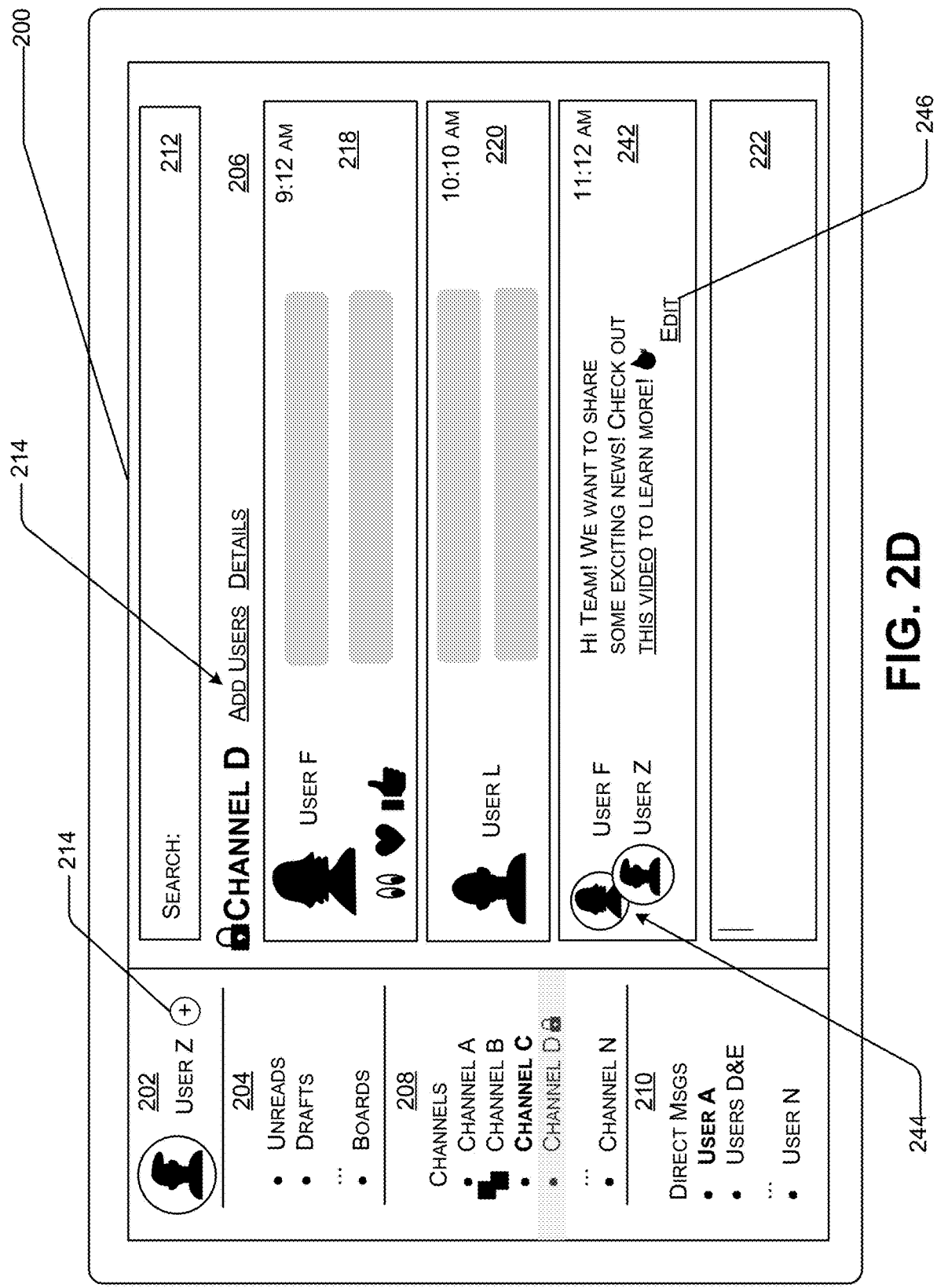
FIG. 2D illustrates the example user interface of FIG. 2A, wherein a mechanism associated with the posted message object enables one or more users of the communication platform to edit the message object.

In at least one example, based at least in part on receiving an input to post the message object to one or more virtual spaces, the message object management component 116 can update the indicator associated with the message object representative of the message object to indicate that the message object is posted and can cause the message object to be presented via instances of the user interface 200 presented by client(s) of member(s) of the target virtual space(s). FIG. 2D illustrates an example of such, wherein the message object is posted to an instance of the user interface 200 presented via a client of a user of the channel. As shown in the second section 206, a new user interface element 242 is presented as part of the feed in the second section 206. In at least one example, the user interface element 242 can include one or more other user interface elements 244 that are representative of the collaborators associated with the message object. That is, the message object, as presented via the user interface 200, can include indication(s) of which user(s) and/or entity(s) generated the message object and/or the message object otherwise originated from. In at least one example, when the message object is posted to, or otherwise presented via, the user interface 200, the message object can retain formatting and/or other aspects as drafted. That is, unlike existing techniques, wherein collaboration can happen via another platform and message object content can be copied and pasted into the communication platform, the message object content can be presented as drafted by the collaborators.

As described above, in some examples, collaborators can be associated with permissions that enable the collaborators to perform a set of actions relative to the message object, wherein other members of the virtual space (e.g., Channel D) do not have the same permissions and/or set of actions. For example, as illustrated in FIG. 2D, the user interface element 242 is associated with an actuation mechanism 246 (e.g., "edit") to enable the user (User Z) to edit the message object associated therewith. As illustrated, User Z is one of the collaborators, so User Z has the permission to edit the message object. However, as presented via another instance of the user interface 200 on a client of a member of the channel (e.g., Channel D) that is not one of the collaborators, such a user interface element may not be presented. In at least one example, if a user or other entity responds to the message object and/or reacts to the message object, each of the collaborators can be notified. That is, the message object management component 116 receives an indication that another user or other entity responds to the message object and/or reacts to the message object (e.g., via respective instance of the user interface 200 on their client), the message object management component 116 can send a notification to respective clients of each of the collaborators.

As described above, in some examples, a user or entity that is not a collaborator can request to be added as a collaborator after the message object has been posted or otherwise presented via the channel. Further, in some examples, an existing collaborator can add another user or entity as a collaborator after the message object has been posted or otherwise presented via the channel.

Figure 2E:
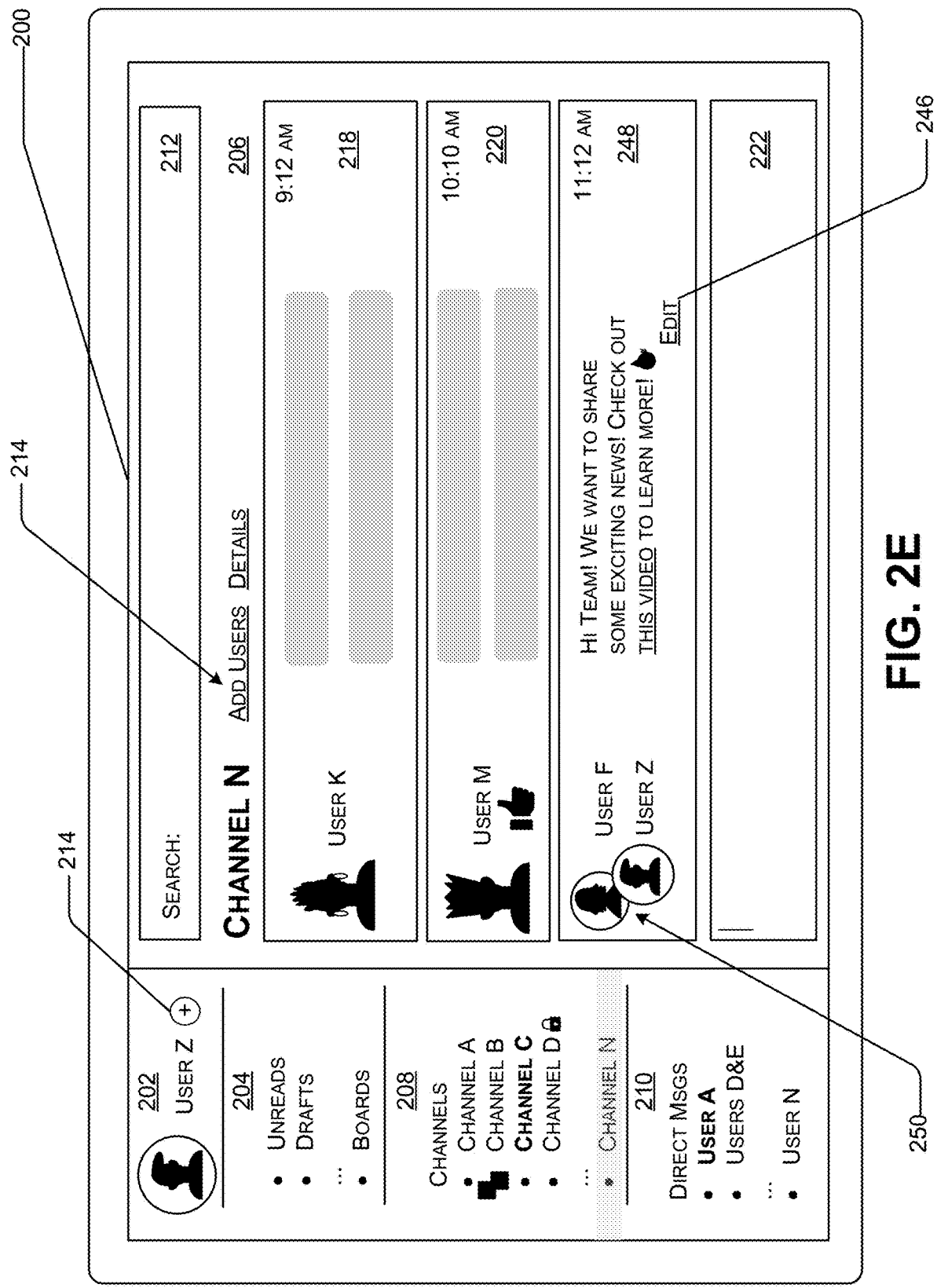
FIG. 2E illustrates the example user interface of FIG. 2A, wherein the message object has been posted to a different virtual space than in FIG. 2D.

As illustrated in FIG. 2E, the message object can be posted to a second virtual space (e.g., Channel N). In FIG. 2E, the message object is posted to an instance of the user interface 200 presented via a client of a user of a second channel (e.g., Channel N). As shown in the second section 206, a user interface element 248 is presented as part of the feed. In at least one example, the user interface element 248 can include one or more other user interface elements 250 that are representative of the collaborators associated with the message object. That is, the message object, as presented via the user interface 200, can include indication(s) of which user(s) and/or entity(s) generated the message object and/or the message object otherwise originated from.

In some examples, if a collaborator is not a member of a channel or other virtual space, the message object may not be posted or otherwise presented via the channel or other virtual space (e.g., such a channel or virtual space may not be presented via the user interface element 238). In some examples, if a collaborator is not a member of a channel or other virtual space that is the target recipient of a message object, the message object management component 116 can associate the collaborator with the channel or other virtual space as a full member or temporary member of the channel or other virtual space. In some examples, if a collaborator is not a member of a channel or other virtual space that is the target recipient of a message object, the message object management component 116 can refrain from associating the collaborator with the channel or other virtual space as a full member or temporary member of the channel or other virtual space, but may grant the collaborator permission to view the message object, message objects associated with the message object (e.g., threads), reactions associated with the message object, and/or the like.

Figure 3A:
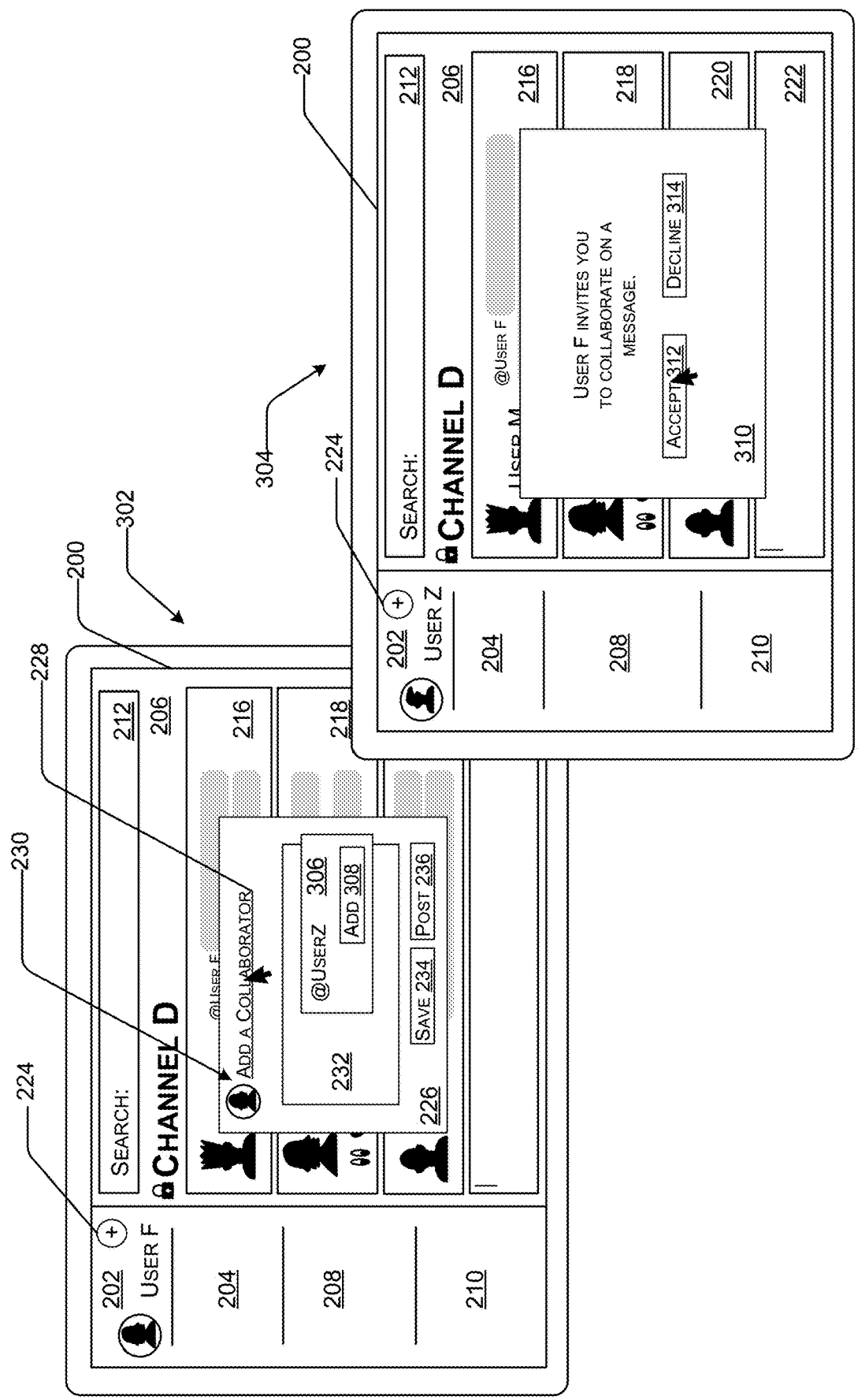
FIG. 3A illustrates an example of two instances of the user interface of FIG. 2A presented via two clients, as described herein, for enabling a first user to invite a second user to collaborate on a draft message object.

FIG. 3A illustrates an example of two instances, 302 and 304, of the user interface 200 of FIG. 2A presented via two clients, as described herein, for enabling a first user to invite a second user to collaborate on a draft message object. In some examples, the composition user interface 226 can be presented via the first instance 302 of the user interface 200 in response to a request, from a client associated with the first user, to generate or edit a message object. As described above, if the request is associated with a request to generate a new message object, the message object management component 116 can generate a new message object. The message object can be associated with an identifier of the first user. In at least one example, the message object can include an indicator that the message object is a draft and/or is not posted or otherwise presented (e.g., is associated with a draft state). In an example where such a request is associated with a request to edit an existing message object, the message object may already exist. In such an example, the message object management component 116 can retrieve the message object and can associate an indicator with the message object indicating that the message object is being edited (e.g., is associated with an editing state).

As described above, in at least one example, the composition user interface 226, presented via the first instance 302 of the user interface 200, can include an actuation mechanism 228 which enables a first user to add a collaborator to the composition user interface 226 for collaborating on a message object. In at least one example, based at least in part on receiving an indication of an interaction with the actuation mechanism 228, the message object management component 116 can cause another user interface element 306 to be presented via the composition user interface 226. The other user interface 306 can enable the first user to tag or otherwise identify a second user as a collaborator. In at least one example, the user interface element 306 can include an actuation mechanism 308 (e.g., "add") that can cause the input associated with the user interface element 306 to be sent to the server(s) 102. As described above, in some examples, collaborators can be added to a message object by additional or alternative means, such as by tagging a user or entity, or the like.

In at least one example, based at least in part on receiving an indication of a second user to add to the composition user interface 226, the message object management component 116 can cause an invitation to be sent to a client of the second user. FIG. 3A illustrates an example of such an invitation being presented via the second instance 304 of the user interface 200. In at least one example, a user interface element 310 representative of the invitation can be presented via the second instance 304 of the user interface 200. In at least one example, the user interface element 310 can include one or more actuation mechanisms 312, 314 (e.g., "accept" or "decline"). In at least one example, the second user can interact with one of the actuation mechanisms to accept (312) or decline (314) the invitation.

Figure 3B:
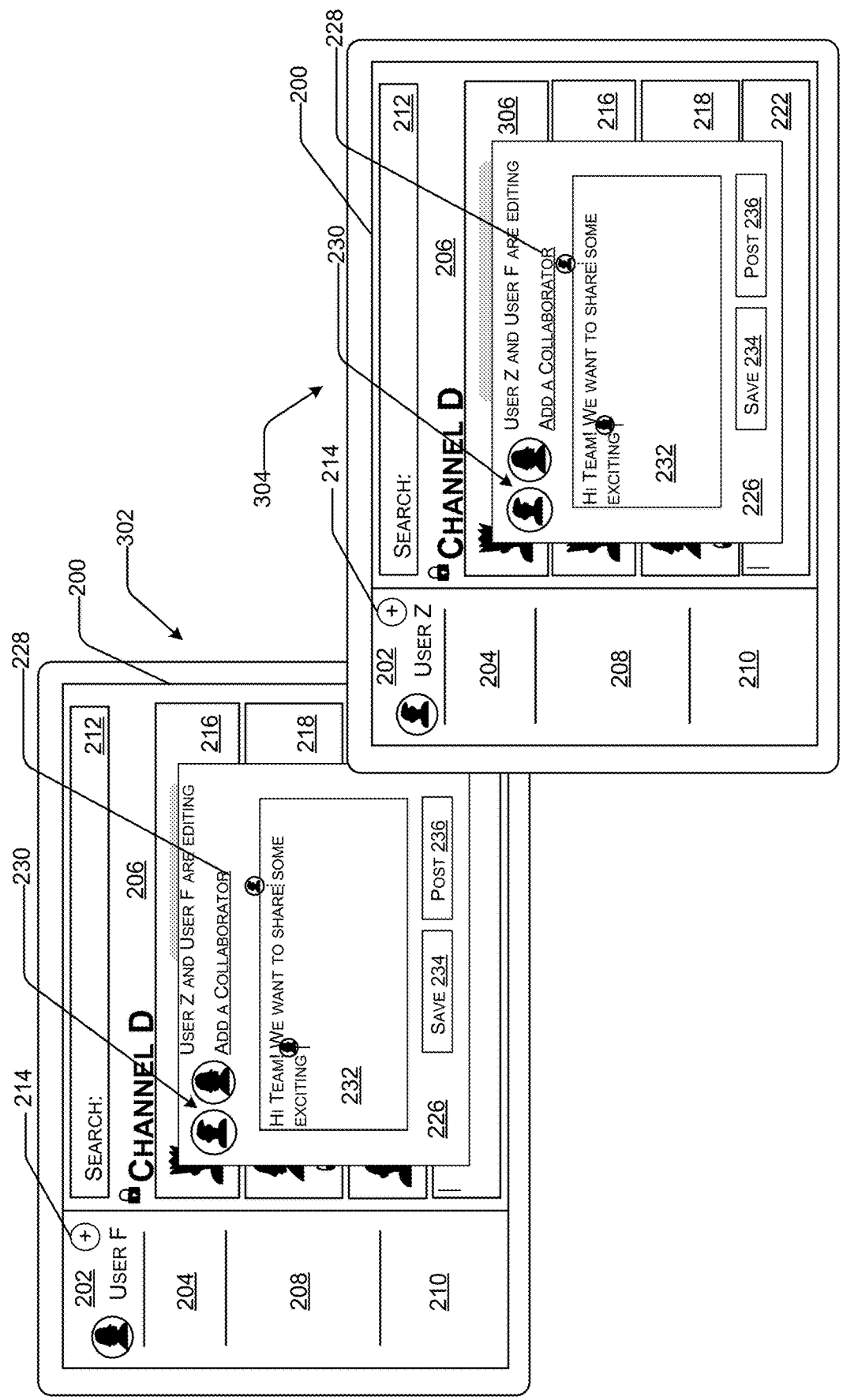
FIG. 3B illustrates an example of two instances of the user interface of FIG. 2A presented via the two clients of FIG. 3A, wherein respective instances of a composition user interface enable collaboration between the first user and the second user.

In at least one example, based at least in part on receiving an indication that the second user accepts the invitation, the message object management component 116 can cause an instance of the composition user interface 226 to be presented via the first instance 302 of the user interface 200 and an instance of the composition user interface 226 to be presented via the second instance 304 of the user interface 200, as illustrated in FIG. 3B. As such, the respective instances of the composition user interface 226 can enable collaboration between the first user and the second user in real-time or near real-time. In some examples, based at least in part on receiving the indication that the second user accepts the invitation, the message object management component 116 can associate a user identifier of the second user with the message object. As such, the second user can comprise a collaborator of the message object.

In at least one example, each of the collaborators can interact with respective instances of the composition user interface 226 to provide comments and/or other feedback, add new content to a message object, delete content from a message object, revise contents of the message object, view a history of modifications (e.g., additions, revisions, etc.), accept proposed modifications, and/or the like. In at least one example, the composition user interface 226 can enable the collaborators to generate and/or edit the message object in real-time or near real-time. In at least one example, when a client of one of the collaborators receives an input associated with the message object, the input can be sent to the message object management component 116, which can update the message object based at least in part on such an input. In at least one example, such an input can be pushed to other instances of the composition user interface 226 using techniques such as operational transform or the like. That is, in at least one example, the message object management component 116 can enable real-time or near real-time collaboration on message objects or other objects.

Figure 4:
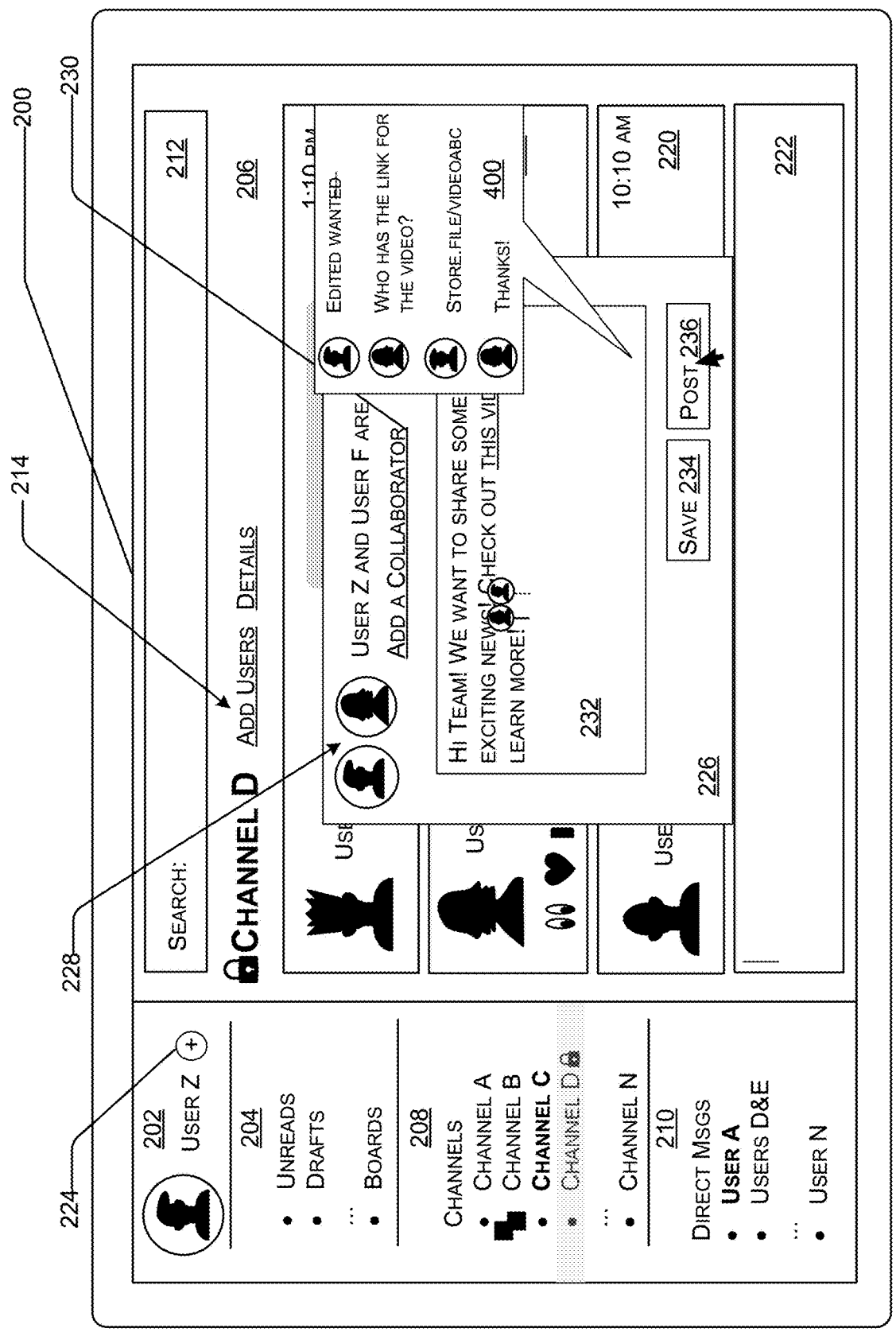
FIG. 4 illustrates an example of the user interface of FIG. 2A, wherein a subsidiary channel is presented in association with draft message object collaboration, as described herein.

FIG. 4 illustrates an example of the user interface 200 of FIG. 2A, wherein a subsidiary channel is presented in association with draft message object collaboration. As described above, in at least one example, each of the collaborators associated with a message object can interact with respective instances of the composition user interface 226 to provide comments and/or other feedback, add new content to a message object, delete content from the message object, revise contents of the message object, view a history of modifications (e.g., additions, revisions, etc.), accept proposed modifications, and/or the like. In at least one example, the composition user interface 226 can enable the collaborators to generate and/or edit the message object in real-time or near real-time. In some examples, individual contributions of individual of the collaborators can be presented in a subsidiary channel or feed, as illustrated in FIG. 4. That is, in some examples, the message object management component 116 can cause a user interface element 400 to be presented via the user interface 200 that includes descriptions of one or more actions taken with respect to the message object (e.g., additions, deletions, and/or other modifications), comments and/or other feedback provided, and/or the like. In some examples, the user interface element 400 representative of the subsidiary channel can be associated with the message object such that each time the message object is edited, the user interface element 400 representative of the subsidiary channel can be presented via the user interface 200.

FIGS. 1-4 make reference to "user interface elements." A user interface element can be any element of the user interface that is representative of an object, message object, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

Figure 5:
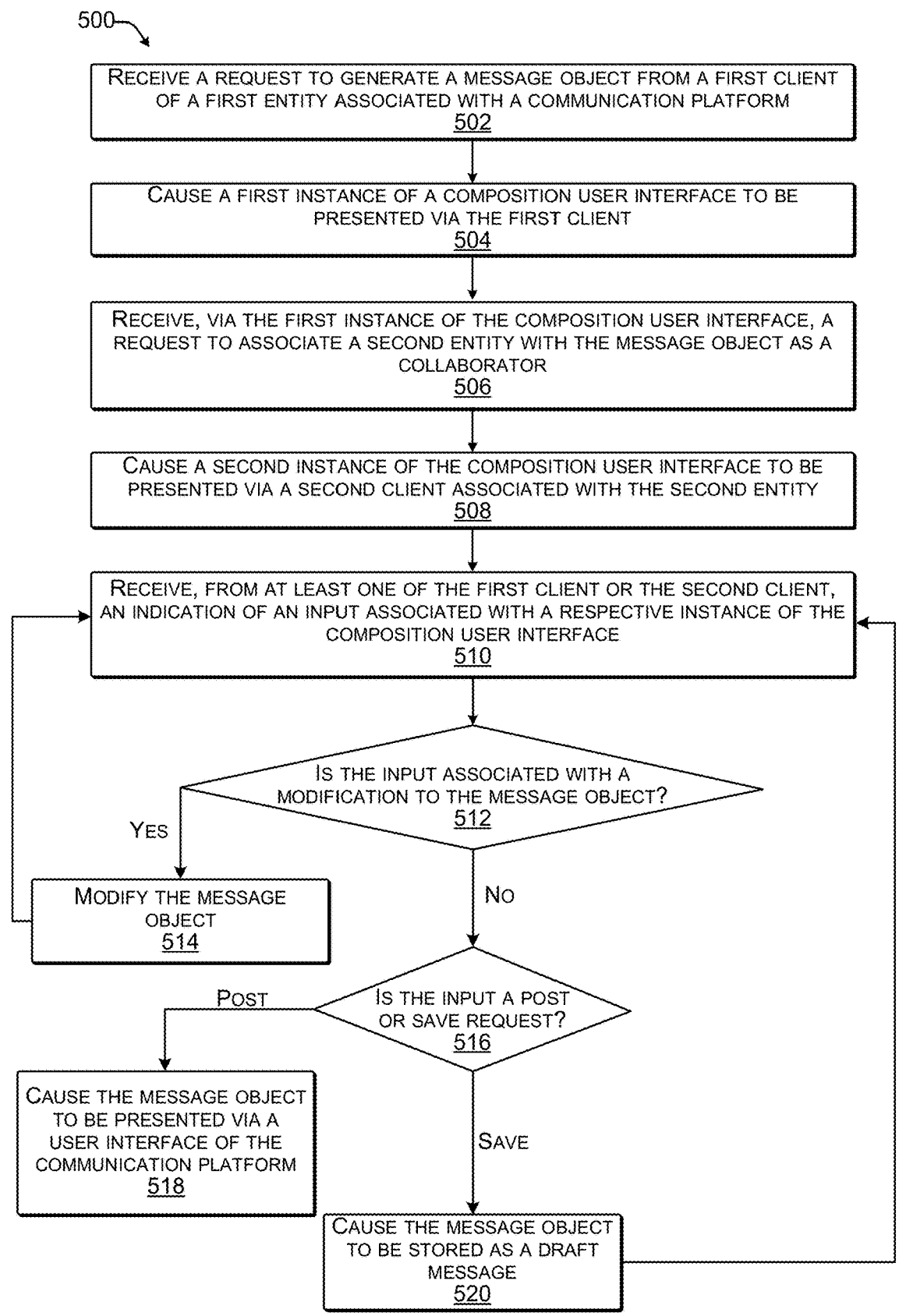
FIG. 5 illustrates an example process for draft message object collaboration, as described herein.
Figure 6:
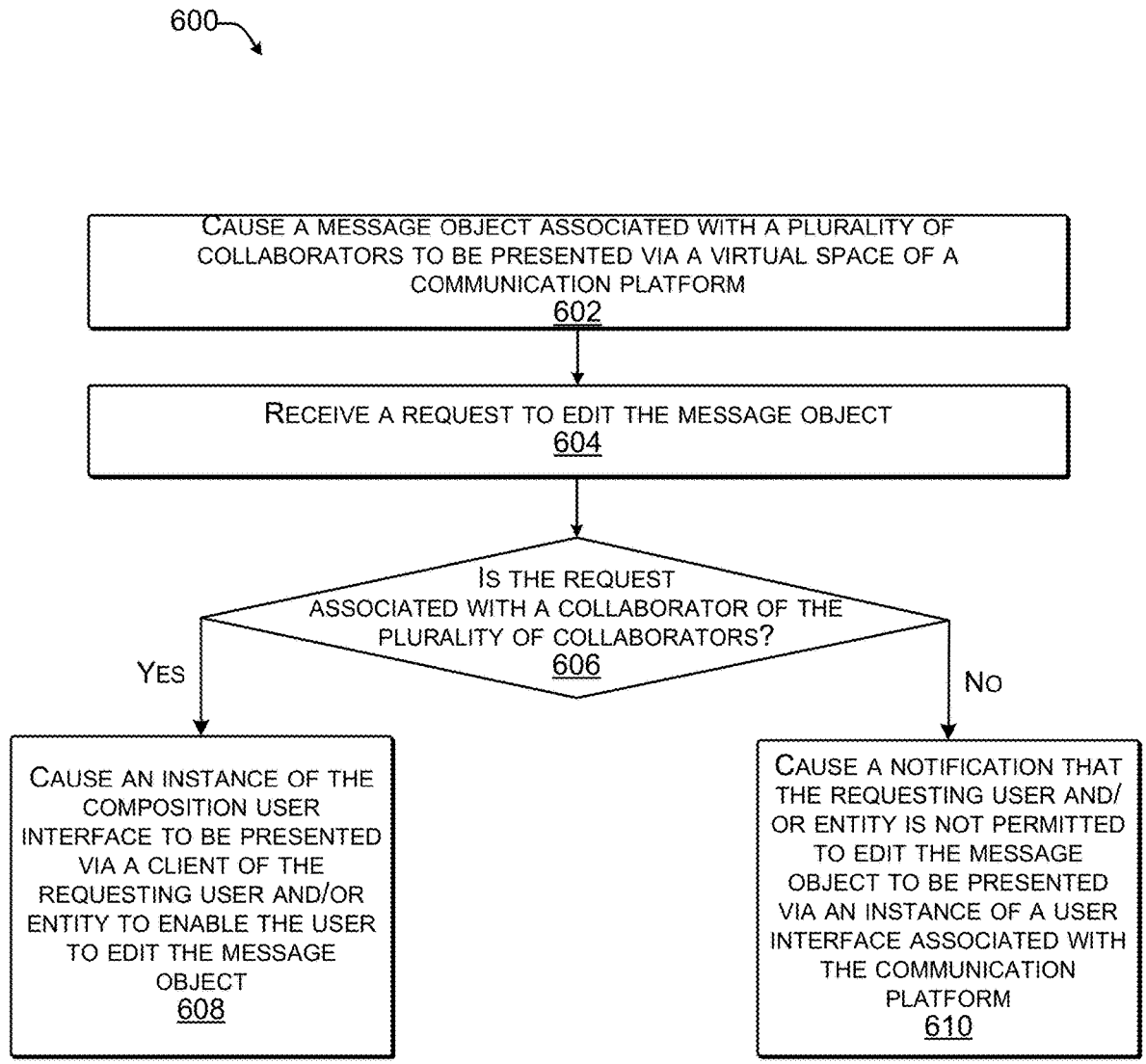
FIG. 6 illustrates an example process for enabling differentiated editing permissions associated with a posted message object that was generated by multiple users, as described herein.

FIGS. 5-6 are flowcharts showing example processes involving techniques as described herein. The processes illustrated in FIGS. 5-6 are described with reference to components of the environment 100 shown in FIG. 1 for convenience and ease of understanding. However, the processes illustrated in FIGS. 5-6 are not limited to being performed using the components described above with reference to the environment 100. Moreover, the components described above with reference to the environment 100 are not limited to performing the processes illustrated in FIGS. 5-6.

The processes in FIGS. 5-6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, message objects, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-6 can be combined in whole or in part with each other or with other processes.

FIG. 5 illustrates an example process 500 for draft message object collaboration, as described herein.

At operation 502, the message object management component 116 can receive a request to generate a message object from a first client of a first entity associated with a communication platform. In at least one example, the message object management component 116 can receive a request to generate a new message object from a first client of a first entity. As described above, the first entity can be any of a user, a role (e.g., marketing team member, engineer, front desk staff, security team member, administrator, etc.), an application, a channel (i.e., members of the channel), a direct message (i.e., members of the direct message), a board (i.e., members of the board), and/or the like. In at least one example, the message object management component 116 can generate a message object in response to receiving the request to generate the new message object. As described above, the message object can persist on the server(s) 102, which can allow for draft synchronization and/or message object collaboration, as described herein.

At operation 504, the message object management component 116 can cause a first instance of a composition user interface to be presented via the first client. In at least one example, the message object management component 116 can cause a composition user interface to be presented via the first client to enable the first entity to associate data with the message object (e.g., text, image(s), video(s), link(s), file(s), etc.). In some examples, as the first user associates data with the message object, the first client can send such data to the message object management component 116. The message object management component 116 can store such data in association with the message object.

At operation 506, the message object management component 116 can receive, via the first instance of the composition user interface, a request to associate a second entity with the message object as a collaborator. In at least one example, the first entity can request to add at least a second entity as a collaborator. That is, in at least one example, the first entity can interact with the first instance of the composition user interface to invite at least the second entity to collaborate in drafting of the message object. In at least one example, based at least in part on receiving the request to add at least the second entity as a collaborator, the message object management component 116 can associate the second entity with the message object. In some examples, the message object management component 116 can associate an identifier of the second entity with the message object.

In some examples, prior to associating at least the second entity with the message object as a collaborator, the message object management component 116 can send an invitation to a second client of the second entity, inviting them to collaborate on the message object. In such examples, the message object management component 116 can wait to associate identifier(s) of the other collaborator(s) with the message object until an acceptance of the invitation is received. That is, in at least one example, the message object management component 116 can associate the identifier(s) of the invited collaborator(s) (e.g., user(s) and/or entity(s)) with the message object associated with the message object in response to receiving an acceptance of the invitation.

At operation 508, the message object management component 116 can cause a second instance of the composition user interface to be presented via a second client associated with the second entity. As described above, in at least one example, each of the collaborators can interact with respective instances of the composition user interface to provide comments and/or other feedback, add new content to a message object, revise contents of the message object, view a history of modifications (e.g., additions, revisions, etc.), accept proposed modifications, and/or the like. In at least one example, the message object management component 116 can cause a second instance of the composition user interface to be presented via a second client associated with the second entity. As such, the respective instance of the composition user interface can enable the collaborators to generate and/or edit the message object in real-time or near real-time.

At operation 510, the message object management component 116 can receive, from at least one of the first client or the second client, an indication of an input associated with a respective instance of the composition user interface. In at least one example, the first entity and/or the second entity can interact with the composition user interface to add content to the message object, remove content from the message object, and/or otherwise modify the message object. In some examples, such an input can be associated with a request to save the message object (e.g., as a draft) or post the message object (e.g., to one or more virtual spaces). In some examples, when a client of one of the collaborators receives an input associated with the message object, the input can be sent to the message object management component 116. That is, in response to at least one of the first entity or the second entity providing an input to a respective instance of the composition user interface, the message object management component 116 can receive an indication of such an input.

At operation 512, the message object management component 116 can determine whether the input is associated with a modification to the message object. As described, in some examples, the first entity and/or the second entity can interact with respective instances of the composition user interface to provide an input. In some examples, the input can be the addition of content (e.g., text, image(s), video(s), link(s), file(s), etc.), removal of content, and/or another modification. Based at least in part on a determination that the input is associated with a modification to the message object, the message object management component 116 can modify the message object, as illustrated at operation 514. In at least one example, the message object management component 116 can update the message object based at least in part on such an input. In at least one example, such an input can be pushed to other instances of the composition user interface using techniques such as operational transform or the like. That is, in at least one example, the message object management component 116 can enable real-time or near real-time collaboration on message objects or other objects. In at least one example, the process can return to operation 510.

At operation 516, the message object management component 116 can determine whether the input is a post or a save request. In at least one example, the composition user interface can include one or more actuation mechanisms to enable the message object to be saved (e.g., as a draft) and/or posted or otherwise delivered to a recipient of the message object. Based at least in part on a determination that the input is associated with a post request, the message object management component 116 can cause the message to be presented via a user interface of the communication platform, as illustrated at operation 518. That is, in at least one example, based at least in part on a determination that the input is associated with a post request, the message object management component 116 can cause the message object to be posted to, or otherwise presented via, one or more virtual spaces. In at least one example, the message object management component 116 can push, or otherwise provide, the message object to client(s) of each of the member(s) associated with the target virtual space(s) and the message object can be presented in association with the target virtual space(s) on each of the client(s). In at least one example, the message object can be posted to, or otherwise presented via, the virtual space(s) with an indication of each of the user(s) and/or entity(s) that collaborated on the composition of the message object. That is, the message object can be associated with an indication that the message object originated from each of the collaborators.

In some examples, prior to posting a message object that is associated with multiple collaborators, the message object management component 116 can initiate an approval process. That is, individual message objects can be associated with approval processes that indicate whether approval is required to post or otherwise present the message object and/or from whom approval is required. In some examples, the approval process can be associated with a priority in which individual of the collaborators are to approve the draft message object. In some examples, a particular collaborator can be required to approve the draft message object. In some examples, each of the collaborators can be required to approve the draft message object.

Based at least in part on a determination that the input is associated with a save request, the message object management component 116 can cause the message to be stored as a draft message, as illustrated at operation 520. That is, in at least one example, based at least in part on a determination that the input is associated with a save request, the message object can be saved as a draft (i.e., not published). In such an example, the process can return to operation 510.

As described above, in at least one example, the collaborators can be associated with permission(s) that enable the collaborators to perform a set of actions associated with the message object after it has been posted or otherwise presented. In some examples, non-collaborators may not be associated with the same permission(s) and/or set of actions. FIG. 6 illustrates an example process 600 for enabling differentiated editing permissions associated with a posted message object that was generated by multiple users, as described herein.

At operation 602, the message object management component 116 can cause a message object associated with a plurality of collaborators to be presented via a virtual space of a communication platform. As described above with reference to the process 500, a message object can be generated by a plurality of collaborators and can be posted or otherwise presented via a virtual space, such as a channel, direct message, board, or the like. Such a message object can be referred to as a "posted message object."

At operation 604, the message object management component 116 can receive a request to edit a posted message object. In at least one example, a client associated with a user or other entity can send a request to edit the posted message object, which can be received by the message object management component 116. In at least one example, the message object management component 116 can determine whether the request is associated with a collaborator of the plurality of collaborators, as illustrated at operation 606. That is, the message object management component 116 can determine whether the user and/or entity associated with the request has permission to edit the posted message object. Based at least in part on a determination that the request is associated with a collaborator of the plurality of collaborators, the message object management component 116 can cause an instance of the composition user interface to be presented via a client of the requesting user and/or entity to enable the requesting user and/or entity to edit the posted message object, as illustrated at operation 608. That is, so long as the user and/or client associated with the request has permission to edit the posted message object (e.g., the user and/or client was one of the original collaborators or has otherwise been added as a collaborator), the message object management component 116 can cause an instance of the composition user interface to be presented via the requesting client. As such, the requesting client can receive an input associated with an edit or other modification to the message object and can provide an indication of such an input to the message object management component 116. The message object management component 116 can cause the posted message object to be updated based at least in part on receiving the indication of the input. That is, the message object management component 116 can update the message object and push, or otherwise provide, an update to one or more recipients of the posted message object (e.g., member(s) of the virtual space(s) to which the message object is posted or otherwise presented). In some examples, other collaborators can receive a notification that one of the collaborators has requested to edit the message object such that one or more of the other collaborators can opt to open respective instance(s) of the composition user interface for collaborative editing. In some examples, an approval process, as described above, may be implemented prior to posting or otherwise presenting an edited message.

In an example where the request is not associated with a collaborator of the plurality of collaborators, the message object management component 116 can cause a notification that the requesting user and/or entity is not permitted to edit the message object to be presented via an instance of a user interface associated with the communication platform.

As described above, however, in some examples, collaborators can be added to a message object after the message object has been posted. In some examples, a user or entity that is not a collaborator at the time the message object is posted or otherwise presented can request to be added as a collaborator. In such examples, the message object management component 116 can receive the request and may add the requesting user or entity as a collaborator. In some examples, the message object management component 116 can utilize permissions to determine whether the requesting user or entity can be added and/or can execute an authorization process for one of the current collaborators to authorize the addition of the requesting user or entity as a collaborator. That is, in at least one example, a user or entity may not be a collaborator at the time the request associated with operation 604 is received but can be added as a collaborator based at least in part on having requested to edit the message object.

FIGS. 1-6 describe techniques related to draft message object collaboration for a communication platform. While techniques described herein are described with reference to "message objects," techniques described herein can be similarly applicable to any other object that can be generated via the communication platform. Examples of such objects can comprise documents, posts, channel descriptions, user profiles, board content, and/or the like. Furthermore, techniques described herein are described in the context of enabling collaboration for message objects and/or other objects to be posted to the communication platform. However, in some examples, techniques described herein can be similarly applicable to generating message objects and/or other objects for posting on third-party platforms, such as social media platforms, email platforms, and/or the like. That is, in some examples, techniques described herein can be applicable to draft message object collaboration within the communication platform for a message object that is posted or otherwise presented via a third-party platform that is integrated with the communication platform (e.g., via one or more application programming interfaces (APIs) and/or software development kits (SDKs)).

Further, as described above, techniques described herein can streamline message object drafting and/or editing in view of current techniques. As described above, the communication platform can utilize permissions to maintain security and privacy for users of the communication platform. However, such permissions can restrict the ability of multiple users or entities to collaborate on drafting message objects or other objects. Due to current limitations of existing technology, users are required to collaborate via another platform (e.g., a word processing platform, an email platform, or the like) to draft a message object or other object. When the message object or other object is ready on the other platform, one of the collaborators can copy the text or other data as generated in the other platform and paste the text or other data into the communication platform. That is, with current techniques, collaborators are required to use multiple platforms if they want to collaborate on a message object or other object prior to posting the message object or other object to the communication platform. Once posted, editing permissions may be limited to the posting user. As such, the other collaborators may not be permitted to edit the message object or other object without going through the posting user. This can cause multiple interactions, with multiple platforms, which can be computationally expensive and cause network congestion. Techniques described herein enable improved techniques that reduce consumption of computing resources and decrease network congestion. That is, by enabling collaboration via respective instances of a composition user interface as described herein, techniques described herein can offer improvements to existing techniques that reduce consumption of computing resources and decrease network congestion. Further techniques described herein enable improved user experience for users of the communication platform.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method comprising: receiving, from a first client associated with a first entity of a group-based communication platform, a request to generate a message object; causing display, on the first client, of a first instance of a draft associated with the message object via a first instance of a composition user interface presented via a first instance of a group-based communication user interface associated with the group-based communication platform; receiving, via the first instance of the composition user interface and from the first client, a request to add at least one second entity as a collaborator to enable the first entity and the second entity to collaborate on the draft of the message object; causing display, on a second client associated with the second entity, of a second instance of the draft associated with the message object in a second instance of a composition user interface presented via a second instance of the group-based communication user interface; receiving, from at least one of the first client or the second client, a modification to the draft associated with the message object; and in response to receiving the modification to the draft associated with the message object, causing the first instance of the draft associated with the message object to be updated as presented via the first instance of the composition user interface and the second instance of the draft associated with the message object to be updated as presented via the second instance of the composition user interface.

B. The method of paragraph A, further comprising: in response to receiving the request to generate the message, generating the message object and associating a first identifier of the first entity with the message object; and in response to receiving the request to add the at least one second entity as a collaborator, associating a second identifier of the second entity with the message object, wherein the message object is associated with an indicator indicating that the message is not presented.

C. The method of paragraph A or B, wherein the first entity is a first user and the second entity is a second user, an application, or a channel.

D. The method of any of claims A-C, wherein the first instance of the composition user interface and the second instance of the composition user interface enable the first entity and the second entity to collaborate on the generation of the draft associated with the message object in real-time.

E. The method of any of claims A-D, further comprising: receiving, from at least one of the first client or the second client, a request to present the message object via at least one of a channel, a direct message, or a board associated with the group-based communication platform; causing display of the message object via the first instance of the group-based communication user interface; and causing display of the message object via the second instance of the group-based communication user interface, wherein the message object, when presented, comprises an indication that the first entity and the second entity are senders of the message object.

F. The method of any of claims A-E, wherein, after the message object is presented via respective instances of the group-based communication user interface, the first entity and the second entity are associated with a first set of actions associated with the message object that are different than a second set of actions associated with a third entity that did not collaborate on the generation of the draft of the message object.

G. The method of any of claims A-F, further comprising: after the message object is presented via respective instances of the group-based communication user interface, receiving a request to edit the message object; and receiving, from at least one of the first client or the second client, a request to add a third entity as a collaborator to enable the first entity, the second entity, and the third entity to collaborate on editing of the message object, wherein the first entity, the second entity, and the third entity are represented as senders of the message object when the message object is presented via the respective instances of the group-based communication user interface.

H. A system comprising: one or more processors; and one or more non-transitory computer-readable media storing instructions that, when executed by the one or more processors, cause the system to perform operations comprising: receiving, from a first client associated with a first entity of a group-based communication platform, a request to generate a message object; causing display, on the first client, of a first instance of a draft associated with the message object via a first instance of a composition user interface presented via a first instance of a group-based communication user interface associated with the group-based communication platform; receiving, via the first instance of the composition user interface and from the first client, a request to add at least one second entity as a collaborator to enable the first entity and the second entity to collaborate on the draft of the message object; causing display, on a second client associated with the second entity, of a second instance of the draft associated with the message object in a second instance of a composition user interface presented via a second instance of the group-based communication user interface; receiving, from at least one of the first client or the second client, a modification to the draft associated with the message object; and in response to receiving the modification to the draft associated with the message object, causing the first instance of the draft associated with the message object to be updated as presented via the first instance of the composition user interface and the second instance of the draft associated with the message object to be updated as presented via the second instance of the composition user interface.

I. The system of paragraph H, the operations further comprising: in response to receiving the request to generate the message, generating the message object and associating a first identifier of the first entity with the message object; and in response to receiving the request to add the at least one second entity as a collaborator, associating a second identifier of the second entity with the message object, wherein the message object is associated with an indicator indicating that the message is not presented.

J. The system of paragraph H or I, wherein the first entity is a first user and the second entity is a second user, an application, or a channel.

K. The system of any of claims H-J, wherein the first instance of the composition user interface and the second instance of the composition user interface enable the first entity and the second entity to collaborate on the generation of the draft associated with the message object in real-time.

L. The system of any of claims H-K, further comprising: receiving, from at least one of the first client or the second client, a request to present the message object via at least one of a channel, a direct message, or a board associated with the group-based communication platform; causing display of the message object via the first instance of the group-based communication user interface; and causing display of the message object via the second instance of the group-based communication user interface, wherein the message object, when presented, comprises an indication that the first entity and the second entity are senders of the message object.

M. The system of any of claims H-L, wherein, after the message object is presented via respective instances of the group-based communication user interface, the first entity and the second entity are associated with a first set of actions associated with the message object that are different than a second set of actions associated with a third entity that did not collaborate on the generation of the draft of the message object.

N. The system of any of claims H-M, the operations further comprising: after the message object is presented via respective instances of the group-based communication user interface, receiving a request to edit the message object; and receiving, from at least one of the first client or the second client, a request to add a third entity as a collaborator to enable the first entity, the second entity, and the third entity to collaborate on editing of the message object, wherein the first entity, the second entity, and the third entity are represented as senders of the message object when the message object is presented via the respective instances of the group-based communication user interface.

O. One or more non-transitory computer-readable media storing instructions that, when executed by one or more processors, cause the one or more processors to perform operations comprising: receiving, from a first client associated with a first entity of a group-based communication platform, a request to generate a message object; causing display, on the first client, of a first instance of a draft associated with the message object via a first instance of a composition user interface presented via a first instance of a group-based communication user interface associated with the group-based communication platform; receiving, via the first instance of the composition user interface and from the first client, a request to add at least one second entity as a collaborator to enable the first entity and the second entity to collaborate on the draft of the message object; causing display, on a second client associated with the second entity, of a second instance of the draft associated with the message object in a second instance of a composition user interface presented via a second instance of the group-based communication user interface; receiving, from at least one of the first client or the second client, a modification to the draft associated with the message object; and in response to receiving the modification to the draft associated with the message object, causing the first instance of the draft associated with the message object to be updated as presented via the first instance of the composition user interface and the second instance of the draft associated with the message object to be updated as presented via the second instance of the composition user interface.

P. The one or more non-transitory computer-readable media of paragraph O, the operations further comprising: in response to receiving the request to generate the message, generating the message object and associating a first identifier of the first entity with the message object; and in response to receiving the request to add the at least one second entity as a collaborator, associating a second identifier of the second entity with the message object, wherein the message object is associated with an indicator indicating that the message is not presented.

Q. The one or more non-transitory computer-readable media of paragraph O or P, wherein the first instance of the composition user interface and the second instance of the composition user interface enable the first entity and the second entity to collaborate on the generation of the draft associated with the message object in real-time.

R. The one or more non-transitory computer-readable media of any of claims O-Q, further comprising: receiving, from at least one of the first client or the second client, a request to present the message object via at least one of a channel, a direct message, or a board associated with the group-based communication platform; causing display of the message object via the first instance of the group-based communication user interface; and causing display of the message object via the second instance of the group-based communication user interface, wherein the message object, when presented, comprises an indication that the first entity and the second entity are senders of the message object.

S. The one or more non-transitory computer-readable media of any of claims O-R, wherein, after the message object is presented via respective instances of the group-based communication user interface, the first entity and the second entity are associated with a first set of actions associated with the message object that are different than a second set of actions associated with a third entity that did not collaborate on the generation of the draft of the message object.

T. The one or more non-transitory computer-readable media of any of claims O-S, the operations further comprising: after the message object is presented via respective instances of the group-based communication user interface, receiving a request to edit the message object; and receiving, from at least one of the first client or the second client, a request to add a third entity as a collaborator to enable the first entity, the second entity, and the third entity to collaborate on editing of the message object, wherein the first entity, the second entity, and the third entity are represented as senders of the message object when the message object is presented via the respective instances of the group-based communication user interface.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
causing a document to be uploaded to a channel of a group-based communication platform that is accessible to a subset of users of a plurality of users of the group-based communication platform, wherein the group-based communication platform maintains a plurality of channels, including the channel, that are authorized to be accessed by different subsets of the plurality of users, wherein the channel facilitates an exchange of messages between the subset of users, posting of documents, and an initiation of at least one of audio calls or video calls;

maintaining, by the group-based communication platform, the document in association with the channel, wherein the document is accessible to the subset of users via navigation to the channel and via user selection of a selectable element representing the document;

determining one or more permissions for at least one of the channel or the document that cause the document to be accessible, from within the channel, to the subset of users;

determining that a first user of the subset of users has opened, and is currently accessing, the document;

causing, via the document and to the first user, display of one or more indications representing one or more second users of the subset of users that currently have the document opened;

determining that the first user has made one or more edits to the document; and causing, via the document, display of the one or more edits concurrently to the one or more second users.

2. The method as recited in claim 1, further comprising:
receiving, via the document and from the first user, a request to share the document with the one or more second users; and
causing, based at least in part on the request, the document to be accessible to the one or more second users.

3. The method as recited in claim 1, further comprising:
determining a first location within the document corresponding to a first cursor associated with a third user of the one or more second users;
determining a second location within the document corresponding to a second cursor associated with a fourth user of the one or more second users; and
causing, via the document and to the first user, display of a first representation associated with the third user at the first location and a second representation associated with the fourth user at the second location.

4. The method as recited in claim 1, further comprising:
receiving, from the first user, a request to upload the document to the channel; and
uploading, based at least in part on the request, the document to the channel such that the document is accessible to the subset of users.

5. The method as recited in claim 1, further comprising:
receiving, from the first user, a request to share the document with the one or more second users;
generating, based at least in part on the request, a link that, upon actuation, causes the document to open; and
at least one of posting the link within the channel or causing the link to be sent to the one or more second users via one or more messages within the group-based communication platform.

6. The method as recited in claim 1, further comprising:
receiving, from the first user, a request to pin the document to the channel; and
causing, based at least in part on the request, the document to be pinned to the channel such that the document is accessible to the subset of users via a dedicated section of the channel.

7. The method as recited in claim 1, wherein the one or more edits include a comment and an at mention associated with a third user of the subset of users, further comprising sending, to the third user and based at least in part on the at mention, a notification associated with the comment.

8. The method as recited in claim 1, wherein the group-based communication platform maintains different versions of the document such that individual users of the subset of users have access to changes to the document over time.

9. A system comprising:
memory;
one or more processors; and
one or more computer-executable instructions stored in the memory and executable by the one or more processors to perform operations comprising:
causing a document to be uploaded to a channel of a group-based communication platform that is accessible to a subset of users of a plurality of users of the group-based communication platform, wherein the group-based communication platform maintains a plurality of channels, including the channel, that are authorized to be accessed by different subsets of the plurality of users, wherein the channel facilitates an exchange of messages between the subset of users, posting of documents, and an initiation of at least one of audio calls or video calls;
maintaining, by the group-based communication platform, the document in association with the channel, wherein the document is accessible to the subset of users via navigation to the channel and via user selection of a selectable element representing the document;
determining one or more permissions for at least one of the channel or the document that cause the document to be accessible, from within the channel, to the subset of users;
determining that a first user of the subset of users has opened, and is currently accessing, the document;
causing, via the document and to the first user, display of one or more indications representing one or more second users of the subset of users that currently have the document opened;
determining that the first user has made one or more edits to the document; and
causing, via the document, display of the one or more edits concurrently to the one or more second users.

10. The system as recited in claim 9, wherein the operations further comprise:
receiving, via the document and from the first user, a request to share the document with the one or more second users; and
causing, based at least in part on the request, the document to be accessible to the one or more second users.

11. The system as recited in claim 9, wherein the operations further comprise:
determining a first location within the document corresponding to a first cursor associated with a third user of the one or more second users;
determining a second location within the document corresponding to a second cursor associated with a fourth user of the one or more second users; and
causing, via the document and to the first user, display of a first representation associated with the third user at the first location and a second representation associated with the fourth user at the second location.

12. The system as recited in claim 9, wherein the operations further comprise:
receiving, from the first user, a request to upload the document to the channel; and
uploading, based at least in part on the request, the document to the channel such that the document is accessible to the subset of users.

13. The system as recited in claim 9, wherein the operations further comprise:
receiving, from the first user, a request to share the document with the one or more second users;

generating, based at least in part on the request, a link that, upon actuation, causes the document to open; and at least one of posting the link within the channel or causing the link to be sent to the one or more second users via one or more messages within the group-based communication platform.

14. The system as recited in claim 9, wherein the operations further comprise:

receiving, from the first user, a request to pin the document to the channel; and causing, based at least in part on the request, the document to be pinned to the channel such that the document is accessible to the subset of users via a dedicated section of the channel.

15. The system as recited in claim 9, wherein the one or more edits include a comment and an at mention associated with a third user of the subset of users, wherein the operations further comprise sending, to the third user and based at least in part on the at mention, a notification associated with the comment.

16. The system as recited in claim 9, wherein the group-based communication platform maintains different versions of the document such that individual users of the subset of users have access to changes to the document over time.

17. One or more non-transitory computer-readable media storing one or more computer-executable instructions that, when executed by one or more processors, cause the one or more processors to perform operations comprising:

causing a document to be uploaded to a channel of a group-based communication platform that is accessible to a subset of users of a plurality of users of the group-based communication platform, wherein the group-based communication platform maintains a plurality of channels, including the channel, that are authorized to be accessed by different subsets of the plurality of users, wherein the channel facilitates an exchange of messages between the subset of users, posting of documents, and an initiation of at least one of audio calls or video calls;

maintaining, by the group-based communication platform, the document in association with the channel, wherein the document is accessible to the subset of users via navigation to the channel and via user selection of a selectable element representing the document;

determining one or more permissions for at least one of the channel or the document that cause the document to be accessible, from within the channel, to the subset of users;

determining that a first user of the subset of users has opened, and is currently accessing, the document;

causing, via the document and to the first user, display of one or more indications representing one or more second users of the subset of users that currently have the document opened;

determining that the first user has made one or more edits to the document; and causing, via the document, display of the one or more edits concurrently to the one or more second users.

18. The one or more non-transitory computer-readable media as recited in claim 17, wherein the operations further comprise:

determining a first location within the document corresponding to a first cursor associated with a third user of the one or more second users;

determining a second location within the document corresponding to a second cursor associated with a fourth user of the one or more second users; and causing, via the document and to the first user, display of a first representation associated with the third user at the first location and a second representation associated with the fourth user at the second location.

19. The one or more non-transitory computer-readable media as recited in claim 17, wherein the operations further comprise:

receiving, from the first user, a request to upload the document to the channel; and uploading, based at least in part on the request, the document to the channel such that the document is accessible to the subset of users.

20. The one or more non-transitory computer-readable media as recited in claim 17, wherein the group-based communication platform maintains different versions of the document such that individual users of the subset of users have access to changes to the document over time.

* * * * *